(12) United States Patent
Takizawa et al.

(10) Patent No.: US 9,293,957 B2
(45) Date of Patent: Mar. 22, 2016

(54) SEGMENT COIL, METHOD OF MANUFACTURING SEGMENT COIL, AND STATOR INCLUDING SEGMENT COIL

(71) Applicant: TOYOTA JIDOSHA KABUSHIKI KAISHA, Toyota-shi, Aichi-ken (JP)

(72) Inventors: Keiji Takizawa, Toyota (JP); Naoto Koshino, Okazaki (JP); Shinichi Iizuka, Osaka (JP); Hironobu Saka, Osaka (JP); Takeshi Ariyoshi, Osaka (JP); Takashi Hirakushi, Osaka (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/354,397

(22) PCT Filed: Oct. 22, 2012

(86) PCT No.: PCT/JP2012/077190
§ 371 (c)(1),
(2) Date: Apr. 25, 2014

(87) PCT Pub. No.: WO2013/061902
PCT Pub. Date: May 2, 2013

(65) Prior Publication Data
US 2014/0300236 A1    Oct. 9, 2014

(30) Foreign Application Priority Data

| Oct. 27, 2011 | (JP) | 2011-235979 |
| Jan. 30, 2012 | (JP) | 2012-016236 |
| Feb. 2, 2012 | (JP) | 2012-020859 |
| Feb. 7, 2012 | (JP) | 2012-023874 |
| Mar. 1, 2012 | (JP) | 2012-045004 |
| Mar. 21, 2012 | (JP) | 2012-063106 |
| Sep. 10, 2012 | (JP) | 2012-198557 |

(51) Int. Cl.
*H02K 3/28* (2006.01)
*H02K 3/12* (2006.01)
(Continued)

(52) U.S. Cl.
CPC .. *H02K 3/28* (2013.01); *H02K 3/12* (2013.01); *H02K 3/34* (2013.01); *H02K 3/38* (2013.01);
(Continued)

(58) Field of Classification Search
CPC ............. H02K 3/28; H02K 3/38; H02K 3/50; H02K 15/0414
USPC .......................................... 310/201, 203, 208
See application file for complete search history.

(56) References Cited

U.S. PATENT DOCUMENTS 3,914,860 A * 10/1975 Schuler ........................... 29/596
4,207,482 A * 6/1980 Neumeyer et al. ............... 310/45
(Continued)

FOREIGN PATENT DOCUMENTS

CN   101689777 A   3/2010
JP   58-157350     9/1983
(Continued)

*Primary Examiner* — Terrance Kenerly
(74) *Attorney, Agent, or Firm* — Finnegan, Henderson, Farabow, Garrett & Dunner, LLP

(57) ABSTRACT

Each of segment coils arranged as aligned in a slot of a stator core includes a coil central portion accommodated in the slot and two coil end portions protruding outward. The coil end portion of the two coil end portions includes a pair of coil pieces formed by inclining a coil at different angles toward the coil central portion with a vertex lying therebetween. Any one of the pair of coil pieces includes in a region in the vicinity of the vertex, a recessed step portion formed from two sides in non-parallel to and at an angle with respect to an end surface of the stator core.

12 Claims, 19 Drawing Sheets

(51) Int. Cl.
   *H02K 3/50*      (2006.01)
   *H02K 3/38*      (2006.01)
   *H02K 15/04*     (2006.01)
   *H02K 3/34*      (2006.01)

(52) U.S. Cl.
   CPC .............. *H02K 3/50* (2013.01); *H02K 15/0414* (2013.01); *H02K 15/0421* (2013.01); *Y10T 29/49009* (2015.01)

(56) References Cited

U.S. PATENT DOCUMENTS

| | | | |
|---|---|---|---|
| 5,346,568 A | * | 9/1994 | Gsellmann ................ 156/83 |
| 5,606,212 A | * | 2/1997 | Sasa et al. .................. 310/270 |
| 6,043,582 A | * | 3/2000 | Markovitz et al. ........... 310/213 |
| 6,462,453 B1 | | 10/2002 | Asao et al. |
| 2003/0214196 A1 | * | 11/2003 | Cai et al. ..................... 310/208 |
| 2005/0121993 A1 | * | 6/2005 | Tagami et al. ............... 310/194 |
| 2008/0231136 A1 | | 9/2008 | Obata |
| 2010/0141078 A1 | | 6/2010 | Kouda et al. |

FOREIGN PATENT DOCUMENTS

| | | | |
|---|---|---|---|
| JP | 5-268737 | | 10/1993 |
| JP | 6-23209 | | 3/1994 |
| JP | 11329115 | * | 11/1999 ............ H01B 13/00 |
| JP | 2001-54247 | | 2/2001 |
| JP | 2001-238419 | | 8/2001 |
| JP | 2004-64989 | | 2/2004 |
| JP | 2005-65363 | | 3/2005 |
| JP | 2008-125328 | | 5/2008 |
| JP | 2008-236924 | | 10/2008 |
| JP | 2010-28943 | | 2/2010 |
| JP | 4688003 | | 2/2011 |
| JP | 2011-193600 | | 9/2011 |
| JP | 2012-16282 | | 1/2012 |

* cited by examiner

SEGMENT COIL, METHOD OF MANUFACTURING SEGMENT COIL, AND STATOR INCLUDING SEGMENT COIL

CROSS-REFERENCE TO RELATED APPLICATIONS

This application is a national phase application of International Application No. PCT/JP2012/077190, filed Oct. 22, 2012, which claims the priority of Japanese Patent Application Nos. 2011-235979, filed Oct. 27, 2011; 2012-016236, filed Jan. 30, 2012; 2012-020859, filed Feb. 2, 2012; 2012-023874, filed Feb. 7, 2012; 2012-045004, filed Mar. 1, 2012; 2012-063106, filed Mar. 21, 2012, and 2012-198557, filed Sep. 10, 2012, the content of all of which are incorporated herein by reference.

TECHNICAL FIELD

The present application claims priority to Japanese Patent Applications Nos. 2011-235979, 2012-016236, 2012-020859, 2012-023874, 2012-045004, 2012-063106, and 2012-198557 filed on Oct. 27, 2011, and Jan. 30, Feb. 2 and 7, Mar. 1 and 21, and Sep. 10, 2012, respectively, the disclosure of which is incorporated by reference herein in its entirety.

The present invention relates to a segment coil capable of achieving reduction in size and effective prevention of deterioration of an insulating film, a method of manufacturing the segment coil, and a stator including the segment coil.

BACKGROUND ART

With reduction in size, higher performance, and higher output of a motor in recent years, a coil formed from a rectangular wire capable of achieving an effectively improved space factor in a slot, in particular, what is called a segment coil obtained by forming a rectangular wire substantially in a U shape, has increasingly been demanded as a coil forming a stator of a motor.

For example, PTD 1 below exemplifies the conventional technique showing such a segment coil.

CITATION LIST

Patent Document

PTD 1: Japanese Patent No. 4688003

SUMMARY OF INVENTION

Technical Problem

PTD 1 above describes an invention relating to a stator of a rotating electric machine and a rotating electric machine including the same, and it is advantageous in that a size of a segment coil can be reduced by decreasing a height of a coil end portion of a stator winding which protrudes from a stator core.

It is noted that a "height of a coil end portion" here means a length from an end surface (an upper surface) of a stator core to a vertex of the coil end portion. A "vertex" here means an outermost point of a coil end portion in an axial direction of an annular core.

In PTD 1 above, however, a plurality of steps are provided in the coil end portion and the plurality of steps are formed after an insulating film is formed on a coil surface. Therefore, the step of working a coil is complicated and deterioration of the insulating film is likely.

Even though an insulating film is formed on the coil surface after the plurality of steps are formed, treatment for insulation of the step portion is difficult and productivity lowers.

A segment coil including a coil end portion obtained by forming two linear coils substantially in a mountain shape without providing steps in the coil end portion has conventionally been available.

Though treatment for insulation is easy in such a segment coil, a height of a coil end portion cannot be decreased and reduction in size of the segment coil cannot be realized.

The segment coil includes an insulating layer for insulation between the segment coil and an adjacent segment coil and between the segment coil and a core. The insulating layer should be free from partial discharge between members. Partial discharge is likely in a portion where a voltage difference is great. For example, in a case that a segment coil is adopted in a stator of a three-phase AC motor, a voltage difference between segment coils belonging to different phases is greatest. Therefore, partial discharge is likely in a portion where segment coils belonging to different phases are in proximity to or in contact with each other.

In a conventional segment coil, an insulating layer capable of accommodating a voltage difference between segment coils belonging to different phases is provided in the entire region of the segment coil so as to prevent partial discharge.

A voltage difference at a site where segment coils belonging to the same layer face each other or at a site where a core and a segment coil face each other is small, and hence it is not necessary to provide an insulating layer large in thickness which can accommodate a large voltage difference. Since an insulating layer capable of accommodating a voltage difference between coils belonging to different phases has been provided in the entire region of the conventional segment coil, a space factor in a slot has been low, which has led to increase in size of a motor and increase in amount of heat generation.

In order to raise a space factor, it is also possible to employ an expensive insulating material low in relative permittivity and high in insulation performance so as to form an insulating layer small in thickness over the entire segment coil, however, it leads to increase in manufacturing cost.

A surge-resistant motor aiming to mitigate a potential difference between insulating layers of adjacent windings by forming a conductive film over an insulating film of a conductor elemental wire has been proposed.

The conductive film, however, is formed by mixing a conductive powdery material such as carbon in a resin, and hence it is low in degree of expansion and contraction. Therefore, crack of a film is likely during working of a coil. Application to bending of a segment coil has thus been difficult.

If a conductive film is provided over the entire region of the segment coil, contact with the conductive film and resultant short circuiting are likely at the time of connection by exposure of a conductor elemental wire at a terminal, and working of a terminal has been difficult.

In order to construct a stator, segment coils in a plurality of types of forms are prepared, these segment coils are attached and assembled in a prescribed order to a prescribed slot, and thereafter a terminal portion of each segment coil should be connected such that these segment coils constitute an integrated coil.

An operation for attaching and connecting the segment coils, however, is burdensome. In addition, since a large number of segment coils should be assembled while they are close to one another, it is difficult to identify each segment coil and a terminal portion to which it should be connected. Therefore, erroneous assembly or erroneous connection is likely.

Furthermore, since segment coils are provided closely to one another, it is difficult also to check erroneous assembly or erroneous connection after assembly or connection, and checking imposes extreme burdens.

The present invention aims to solve the conventional problems and to provide a segment coil capable of achieving reduction in size and effective prevention of deterioration of an insulating film, a method of manufacturing the segment coil, and a stator including the segment coil.

The invention of the present application aims to provide a segment coil capable of allowing flow of a high current by setting a large cross-sectional area of a coil and achieving prevention of partial discharge and improved performance of a motor with a space factor being raised.

The invention of the present application aims to solve the conventional problems and to provide a stator capable of allowing flow of a high current by setting a large cross-sectional area of a coil and achieving prevention of partial discharge and improved performance of a motor with a space factor being raised.

The invention of the present application aims to provide a segment coil capable of allowing easy identification of a large number of segment coils, attachment to a prescribed slot where each segment coil should be attached, and easy identification and connection of a terminal portion to which a segment coil should be connected.

Solution to Problem

A segment coil according to the present invention has a first feature that, in a stator of a rotating electric machine formed from an annular core and coils of a plurality of phases, segment coils are arranged as aligned in a radial direction in slots of the annular core and coils in adjacent slots are arranged as aligned in a circumferential direction, the segment coil includes a straight portion accommodated in the slot and two coil end portions protruding outward from the slot, any one coil end portion of the two coil end portions includes a pair of coil pieces formed by inclining a coil at different angles toward the straight portion with a vertex lying therebetween, and a recessed step portion formed from two sides in non-parallel to and at an angle with respect to an end surface of the annular core such that inclination on a vertex side is greater is provided in a region in the vicinity of the vertex in a coil piece of the pair of coil pieces which is to be sunk radially inward of an adjacent segment coil.

According to the first feature of the present invention, the segment coil is such that, in a stator of a rotating electric machine formed from an annular core and coils of a plurality of phases, segment coils are arranged as aligned in a radial direction in slots of the annular core and coils in adjacent slots are arranged as aligned in a circumferential direction, the segment coil includes a straight portion accommodated in the slot and two coil end portions protruding outward from the slot, any one coil end portion of the two coil end portions includes a pair of coil pieces formed by inclining a coil at different angles toward the straight portion with a vertex lying therebetween, and a recessed step portion formed from two sides in non-parallel to and at an angle with respect to an end surface of the annular core such that inclination on a vertex side is greater is provided in a region in the vicinity of the vertex in a coil piece of the pair of coil pieces which is to be sunk radially inward of an adjacent segment coil. Therefore, by providing a recessed step portion, a height of a coil end portion can be decreased. Thus, a size of a segment coil can be reduced.

In a case that a plurality of segment coils are arranged as aligned, on one side of a coil including a recessed step portion, a gap can effectively be formed between adjacent segment coils.

The segment coil according to the present invention has, in addition to the first feature of the present invention, a second feature that an additional insulating layer is provided in a prescribed region of a coil piece of the pair of coil pieces not including the recessed step portion.

According to the second feature of the present invention, in addition to a function and effect of the first feature of the present invention, an additional insulating layer is provided in a prescribed region of a coil piece of the pair coil pieces not including the recessed step portion. Therefore, a thickness of an insulating film in a prescribed region of a coil piece not including a recessed step portion can be increased, so that deterioration of an insulating film can effectively be prevented.

The segment coil according to the present invention has, in addition to the second feature of the present invention, a third feature that the additional insulating layer is provided in a portion where segment coils belonging to different phases face each other.

According to the third feature of the present invention, in addition to a function and effect of the second feature of the present invention, the additional insulating layer is provided in a portion where segment coils belonging to different phases face each other. Therefore, a thickness of an insulating layer can be different in accordance with a voltage difference between adjacent coils or between a coil and a core. Partial discharge can thus efficiently be prevented without lowering in reliability. In addition, since an average thickness of an insulating layer can be decreased, reduction in weight can also be achieved. Manufacturing cost can also be reduced.

The segment coil according to the present invention has, in addition to the second or third feature of the present invention, a fourth feature that the additional insulating layer is formed on a radially inner surface and/or a radially outer surface of the annular core of the segment coil.

According to the fourth feature of the present invention, in addition to a function and effect of the second or third feature of the present invention, the additional insulating layer is formed on a radially inner surface and/or a radially outer surface of the annular core of the segment coil. Therefore, a region where an additional insulating layer is provided can further be reduced.

The segment coil according to the present invention has, in addition to any one of the second to fourth features of the present invention, a fifth feature that the coil end portion is formed in a mountain shape and the additional insulating layer is provided in an oblique side portion except for a portion in the vicinity of a peak portion of the mountain shape and portions in the vicinity of opposing mountain-foot portions and/or in a straight portion extending from the slot.

According to the fifth feature of the present invention, in addition to a function and effect of any one of the second to fourth features of the present invention, the coil end portion is formed in a mountain shape and the additional insulating layer is provided in an oblique side portion except for a portion in the vicinity of a peak portion of the mountain shape and portions in the vicinity of opposing mountain-foot portions and/or in a straight portion extending from the slot. Therefore, an additional insulating layer can readily and reliably be formed and lowering in insulation due to crack or peel-off of an additional insulating layer can effectively be prevented.

Namely, in order to prevent crack or peel-off of an additional insulating layer, an additional insulating layer is preferably provided in a prescribed region of a portion which is not bent or a portion bent at a large radius of curvature.

For example, in a case that a coil end portion is formed in a mountain shape, a portion in the vicinity of a peak portion of the mountain shape or a portion in the vicinity of a mountain-foot portion of the mountain shape representing transition from an oblique side of the mountain shape to a straight portion accommodated in a slot portion is bent at a radius of curvature 0.5 to 3 times as high as that for a long side in a rectangular cross-section of a coil. An oblique side portion except for the portion in the vicinity of the peak portion of the mountain shape and the portions in the vicinity of opposing mountain-foot portions is bent at a radius of curvature 20 to 60 times as high as that for the long side in the rectangular cross-section of the coil. A straight portion extending from a slot is not bent.

Therefore, by providing an additional insulating layer in an oblique side portion except for the portion in the vicinity of the peak portion of the mountain shape and the portions in the vicinity of opposing mountain-foot portions and/or in the straight portion, an additional insulating layer can readily and reliably be formed and lowering in insulation due to crack or peel-off of the additional insulating layer can effectively be prevented.

It is noted that the oblique side portion can be subjected to prescribed bending along a circumferential direction of the stator. As bending along the circumferential direction, for example, such bending as bending the oblique side portion at one or two or more location(s) to form a substantially polygonal shape or such bending as varying a center of a radius of curvature or a curvature can be performed.

The segment coil according to the present invention has, in addition to the first feature of the present invention, a sixth feature that a semiconductive layer is provided in a prescribed region of a coil piece of the pair of coil pieces not including the recessed step portion and the semiconductive layer of a segment coil arranged in proximity and belonging to a different phase is in contact at at least one point.

According to the sixth feature of the present invention, in addition to a function and effect of the first feature of the present invention, a semiconductive layer is provided in a prescribed region of a coil piece of the pair of coil pieces not including the recessed step portion and the semiconductive layer of a segment coil arranged in proximity and belonging to a different phase is in contact at at least one point. Therefore, by providing a semiconductive layer in a prescribed region of a coil piece, charges at the surface of the coil are distributed and electric field intensity is lowered. As intensity of electric field is lowered, partial discharge is suppressed even though a voltage higher than a partial discharge inception voltage is generated in a case that no semiconductive layer is provided. Namely, even though segment coils belonging to different phases are adjacently arranged, a potential difference due to accumulation of charges does not increase between these segment coils and partial discharge at such a site can effectively be prevented.

Namely, according to the invention of the present application, semiconductive layers provided in segment coils belonging to different phases are in contact with each other at at least one point so that partial discharge between these segment coils can effectively be prevented. So long as contact at at least one point is achieved, a form of contact at the contact point is not limited. For example, not only point contact but also line contact or surface contact is acceptable. Even when a thickness of a semiconductive layer is small, an effect thereof can be exhibited. Therefore, as compared with the conventional technique of increasing a thickness of an insulating layer, a weight of a stator can be reduced and manufacturing cost can be reduced.

The segment coil according to the present invention has, in addition to any one of the first to sixth features of the present invention, a seventh feature that a colored identification portion is provided on a surface in a prescribed region of the segment coil.

According to the seventh feature of the present invention, in addition to a function and effect of any one of the first to sixth features of the present invention, a colored identification portion is provided on a surface in a prescribed region of the segment coil. Therefore, color identification can be used as an identification label in a step of assembling a stator, and a segment coil can be high in manufacturing efficiency.

The segment coil according to the present invention has, in addition to the seventh feature of the present invention, an eighth feature that a coil end portion not including the recessed step portion of the two coil end portions of the segment coil includes a terminal portion for connection of an adjacent segment coil and a first colored identification portion allowing identification of a terminal portion of a segment coil to be connected is provided in the terminal portion or in a portion in the vicinity of the terminal portion.

According to the eighth feature of the present invention, in addition to a function and effect of any one of the first to seventh features of the present invention, a coil end portion not including the recessed step portion of the two coil end portions of the segment coil includes a terminal portion for connection of an adjacent segment coil and a first colored identification portion allowing identification of a terminal portion of a segment coil to be connected is provided in the terminal portion or in the vicinity of the terminal portion. Therefore, in a step of connecting a connection portion of each segment coil attached to a prescribed slot of the annular core, a connection portion to be connected can be identified and erroneous connection can effectively be prevented.

A construction or a form of the first colored identification portion is not particularly limited. For example, colored identification portions of the same color can be provided in connection portions of segment coils to be connected to each other or in the vicinity thereof. A site where a colored identification portion is provided is not particularly limited either, and a colored identification portion can be provided in a connection portion or in the vicinity thereof so as to allow identification of a connection portion during a connection operation.

By forming a first colored identification portion at a site allowing external identification after end of assembly, image recognition of the first colored identification portion is allowed so that whether connection is erroneous or not can be checked.

The segment coil according to the present invention has, in addition to the seventh or eighth feature of the present invention, a ninth feature of including a second colored identification portion provided on a surface other than the terminal portion and formed to allow identification of a slot where each segment coil is attached and/or a position of disposition in the slot.

According to the ninth feature of the present invention, in addition to a function and effect of the seventh or eighth feature of the present invention, a second colored identification portion provided on a surface other than the terminal portion and formed to allow identification of a slot where each segment coil is attached and/or a position of disposition in the slot is included. Therefore, a prescribed segment coil can readily be attached to a prescribed slot. In addition, an order of disposition in each slot can readily be checked. It is noted that a second colored identification portion provided for attachment of a prescribed segment coil to a prescribed slot and a second colored identification portion for identification of an order of disposition in each slot can be formed such that their roles are combined, or they can also be provided as independent colored identification portions at different sites.

The second colored identification portion provided for attachment of a prescribed segment coil to a prescribed slot can be formed, for example, to have the same color for each slot. In order to recognize a position of disposition of segment coils attached to each slot, for example, second colored identification portions colored in the same color such that density is varied in the order of disposition can be provided.

The segment coil according to the present invention has, in addition to the ninth feature of the present invention, a tenth feature that the second colored identification portion is provided by applying a color paint, bonding a color tape material, or attaching a color tube material to a prescribed region of the segment coil.

According to the tenth feature of the present invention, in addition to a function and effect of the ninth feature of the present invention, the second colored identification portion is provided by applying a color paint, bonding a color tape material, or attaching a color tube material to a prescribed region of the segment coil. Therefore, the second colored identification portion can readily be formed.

The second colored identification portion can be provided by coloring the entire or partial region of the coil end portion. The second colored identification portion should only be provided at least in the coil end portion. The second colored identification portion can also be provided by coloring the entire insulating layer of each segment coil.

The segment coil according to the present invention has, in addition to the ninth or tenth feature of the present invention, an eleventh feature that the second colored identification portion serves as an additional insulating layer.

According to the eleventh feature of the present invention, in addition to a function and effect of the ninth or tenth feature of the present invention, the second colored identification portion serves as an additional insulating layer. Therefore, not only an operation for assembling a stator can be facilitated but also a segment coil capable of achieving efficient prevention of partial discharge and improved reliability of a stator can be obtained.

A construction or a form of the second colored identification portion is not particularly limited. In order to effectively prevent partial discharge, for example, a required partial discharge voltage can be ensured by applying a paint composed of an insulating resin to a thickness from 20 to 200 μm. When a thickness is not greater than 20 μm, partial discharge may be likely between proximate coils and required strength of a film cannot be ensured. When a thickness is equal to or greater than 200 μm, it becomes difficult to ensure a space for attaching a coil.

A second colored identification portion also serving as an additional insulating layer can be formed by adopting an insulating tape material or an insulating tube material. As a color tape material having a partial discharge prevention effect, an insulating resin tape material manufactured by Permacel (trade name Kapton tape) can be adopted. An insulating resin tube manufactured by Sumitomo Electric Industries, Ltd. (trade name Sumitube) can be adopted as a color tube material.

A stator according to the present invention has a twelfth feature of having the segment coils according to any one of claims 1 to 11 arranged as aligned in slots of an annular core.

According to the twelfth feature of the present invention, the stator is such that the segment coils according to any one of claims 1 to 11 are arranged as aligned in slots of an annular core. Therefore, a segment coil can be reduced in size and deterioration of an insulating film can effectively be prevented.

The stator according to the present invention has, in addition to the twelfth feature of the present invention, a thirteenth feature that, by inclining at least one set of adjacent segment coils arranged in the same slot among segment coils arranged as aligned in slots of the annular core in a radial direction in a region extending from the slot to a portion where it is bent in a circumferential direction toward a vertex of the coil end portion, an insulating layer provided in the coil end portion of the segment coil is formed such that the insulating layer is brought in contact in the radial direction of the stator and a distance between coils in the radial direction of the stator at a portion in contact is greater than a distance between coils within the slot.

According to the thirteenth feature of the present invention, in addition to a function and effect of the twelfth feature of the present invention, by inclining at least one set of adjacent segment coils arranged in the same slot among segment coils arranged as aligned in slots of the annular core in a radial direction in a region extending from the slot to a portion where it is bent in a circumferential direction toward a vertex of the coil end portion, an insulating layer provided in the coil end portion of the segment coil is formed such that the insulating layer is brought in contact in the radial direction of the stator and a distance between coils in the radial direction of the stator at a portion in contact is greater than a distance between coils within the slot. Therefore, a high space factor in a slot can further be realized and the number of turns of a coil in the slot can effectively be increased.

Deterioration of an insulating film in at least one set of adjacent segment coils arranged in the same slot can further effectively be prevented.

A method of manufacturing a segment coil according to the present invention is a method of manufacturing the segment coil according to claim 1, and it has a fourteenth feature of including a coil element forming step of forming a coil element by bending an elemental wire formed from a rectangular wire, and the coil element forming step has a coil piece forming step of forming in any one coil end portion of two coil end portions provided in the coil element, a pair of coil pieces formed by inclining a coil at different angles toward a straight portion with a vertex lying therebetween and a recessed step portion forming step of forming a recessed step portion formed from two sides in non-parallel to and at an angle with respect to an end surface of the annular core in a region in the vicinity of the vertex in a coil piece of the pair of coil pieces which is to be sunk radially inward of an adjacent segment coil.

According to the fourteenth feature of the present invention, the method of manufacturing a segment coil is a method of manufacturing the segment coil according to claim 1, and it includes a coil element forming step of forming a coil element by bending an elemental wire formed from a rectangular wire, and the coil element forming step has a coil piece forming step of forming in any one coil end portion of two coil end portions provided in the coil element, a pair of coil pieces formed by inclining a coil at different angles toward a straight portion with a vertex lying therebetween and a recessed step portion forming step of forming a recessed step portion formed from two sides in non-parallel to and at an angle with respect to an end surface of the annular core in a region in the vicinity of the vertex in a coil piece of the pair of coil pieces which is to be sunk radially inward of an adjacent segment coil. Therefore, by providing a recessed step portion, a height of a coil end portion can be decreased. Therefore, a segment coil capable of achieving reduction in size can be manufactured.

When a plurality of segment coils are arranged as aligned, a gap can effectively be formed between adjacent segment coils on a side of a coil piece including a step portion.

The method of manufacturing the segment coil according to the present invention has, in addition to the fourteenth feature of the present invention, a fifteenth feature of including an insulating layer forming step of forming an insulating layer by covering a surface of the coil element with an insulating substance, and the insulating layer forming step includes a base insulating layer forming step of forming a base insulating layer by integrally covering the coil element with an insulating substance and an additional insulating layer forming step of forming an additional insulating layer by additionally covering with an insulating substance, a prescribed region of a coil piece of the pair of coil pieces not having the recessed step portion formed, after the base insulating layer forming step.

According to the fifteenth feature of the present invention, in addition to a function and effect of the fourteenth feature of the present invention, the method of manufacturing a segment coil includes an insulating layer forming step of forming an insulating layer by covering a surface of the coil element with an insulating substance, and the insulating layer forming step includes a base insulating layer forming step of forming a base insulating layer by integrally covering the coil element with an insulating substance and an additional insulating layer forming step of forming an additional insulating layer by additionally covering with an insulating substance, a prescribed region of a coil piece of the pair of coil pieces not having the recessed step portion formed, after the base insulating layer forming step. Therefore, a thickness of an insulating film in a prescribed region of a coil piece on a side of a coil piece not including a step portion can be increased, so that a segment coil capable of achieving effective prevention of deterioration of an insulating film can be manufactured.

The method of manufacturing the segment coil according to the present invention has, in addition to the fifteenth feature of the present invention, a sixteenth feature of having a colored identification portion forming step of providing prescribed coloring to a prescribed region of the surface of the coil element simultaneously with or subsequent to the additional insulating layer forming step.

According to the sixteenth feature of the present invention, in addition to a function and effect of the fifteenth feature of the present invention, a colored identification portion forming step of providing prescribed coloring to a prescribed region of the surface of the coil element simultaneously with or subsequent to the additional insulating layer forming step is included. Therefore, a colored identification portion can efficiently be formed.

Advantageous Effects of Invention

A size of a segment coil can be reduced. Deterioration of an insulating film in a coil end portion in a case that a plurality of segment coils are arranged as aligned in slots of a stator core can effectively be prevented.

A size of a stator can be reduced.

DESCRIPTION OF EMBODIMENTS

An embodiment of the present invention will specifically be described hereinafter with reference to the drawings.

Initially, for understanding of the present invention, a segment coil 12, a stator 10 including segment coil 12, a motor 1 including stator 10, and a method of manufacturing segment coil 12 according to a first embodiment of the present invention will be described initially with reference to the drawings below. The description below, however, is an embodiment of the present invention and does not limit the disclosure in the scope of claims for patent.

Motor 1 (a rotating electric machine) including segment coil 12 according to the embodiment of the present invention will be described initially with reference to FIGS. 1 and 2.

Motor 1 including segment coils 12 according to the embodiment of the present invention is constituted of stator 10 which will be described later and a not-shown rotor.

Figure 1:
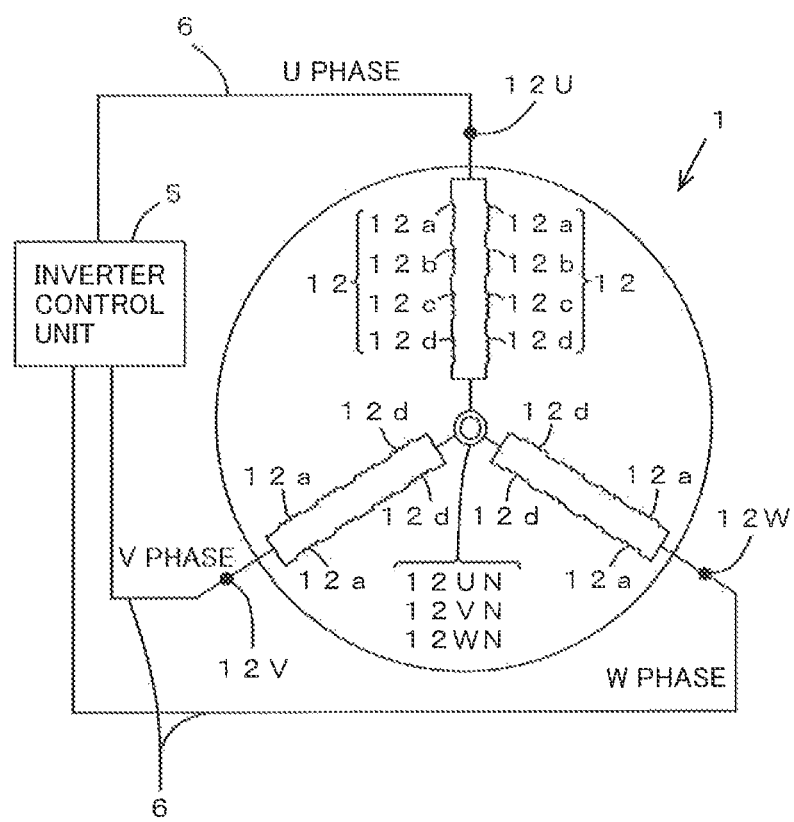
FIG. 1 is a schematic wiring diagram of a motor including segment coils according to an embodiment of the present invention.
Figure 2:
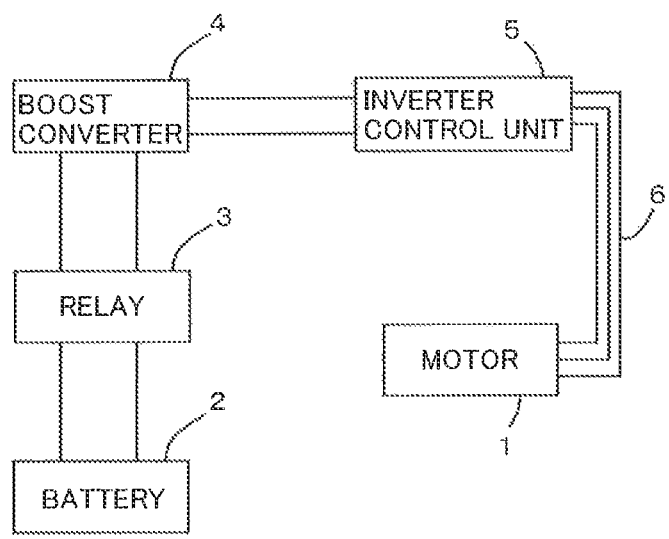
FIG. 2 is a schematic diagram showing a system for distribution to the motor.

As shown in FIGS. 1 and 2, this motor 1 is a three-phase motor of PWM drive (Pulse Width Modulation) supplied with electric power switched in inverter control. Specifically, as shown in FIG. 2, a voltage of electric power from a battery 2 is raised by a relay 3 and a boost converter 4, and electric power is supplied to motor 1 through an inverter control unit 5 including a switching element and input terminals of a U-phase, a V-phase, and a W-phase connected to a high-voltage cable 6. As shown in FIG. 1, the U-phase, the V-phase, and the W-phase are such that a pair of four wound coils 12a to 12d connected in series are connected in parallel.

Any switching element such as a vertical MOSFET (Metal Oxide Semiconductor Field Effect Transistor), a lateral device, a thyristor, a GTO (Gate Turn-Off Thyristor), a bipolar transistor, and an IGBT (Insulated Gate Bipolar Transistor) can be employed as the switching element.

Segment coil 12, stator 10 including segment coils 12, and motor 1 including stator 10 according to the embodiment of the present invention will be described hereinafter further in detail also with reference to FIGS. 3 to 9.

Figure 5:
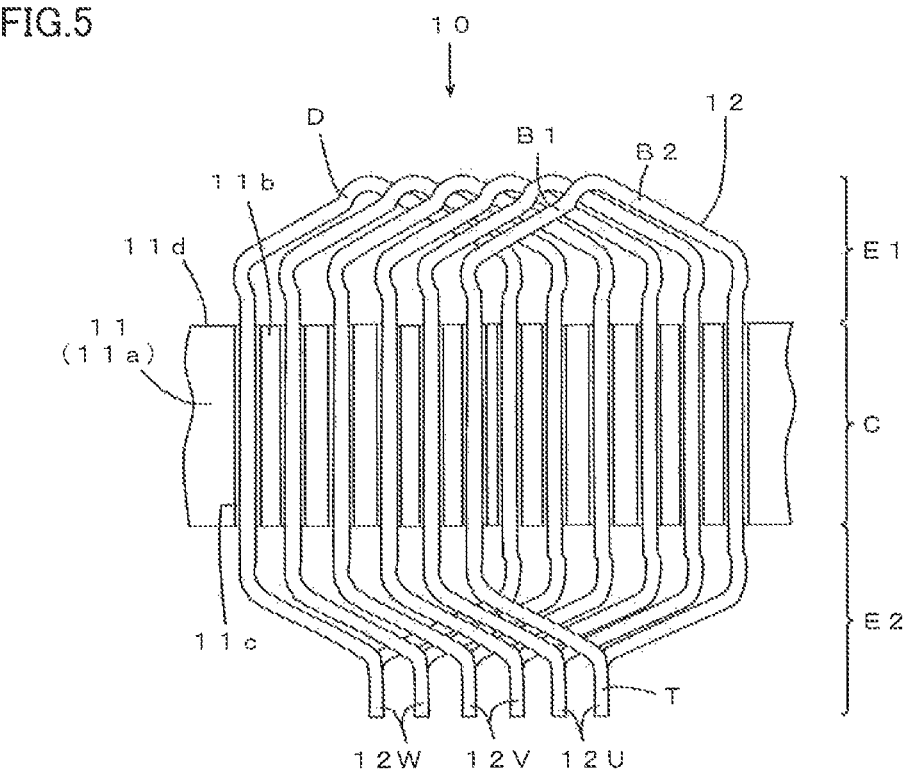
FIG. 5 is a diagram showing in a simplified manner, a main portion of a state that the segment coils according to the first embodiment of the present invention are assembled into an annular core when viewed from a rotor side.

Stator 10 is a stator of motor 1 and it is constituted of an annular core 11 and segment coil 12 formed by shaping a covered electric wire formed from a rectangular wire substantially in a U shape as shown in FIG. 5.

Figure 3:
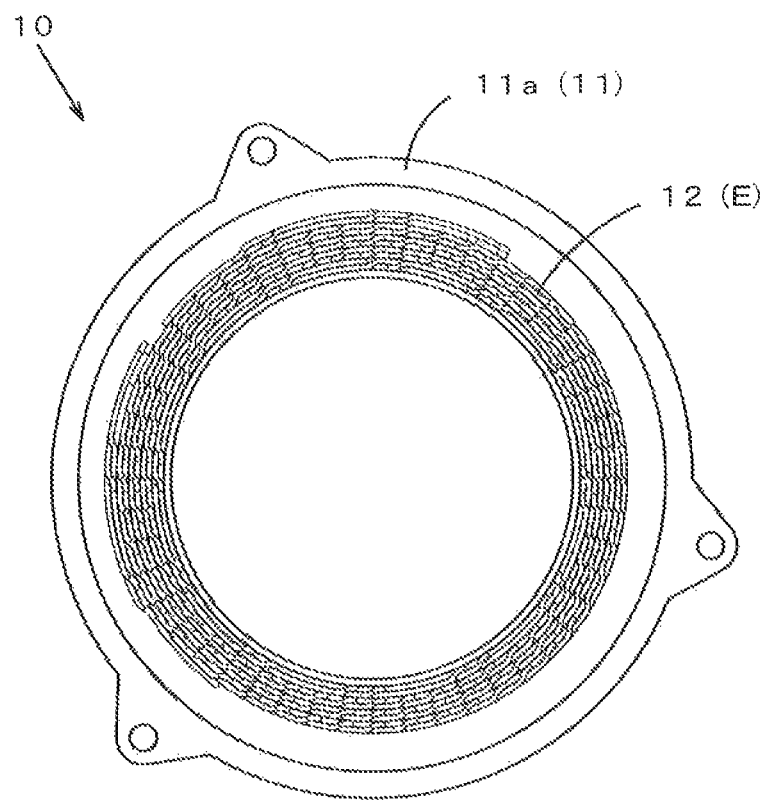
FIG. 3 is a plan view showing a stator including the segment coils according to the embodiment of the present invention.

As shown in FIGS. 3 and 5, annular core 11 is constituted of an annular core main body 11a and a plurality of annularly arranged tooth portions 11b. A plurality of slot portions 11c are formed on opposing sides of tooth portion 11b and segment coils 12 are assembled into annular core 11 as segment coils 12 are accommodated in these slot portions 11c.

Segment coil 12 is what is called a covered electric wire formed from a rectangular wire to be assembled into annular core 11. This segment coil 12 is constituted of an elemental wire R formed from a conductor shown in FIGS. 9A and 9B and an insulating layer Z which is an insulating film covering elemental wire R as will be described later.

As shown in FIG. 5, this segment coil 12 mainly includes a pair of linear straight portions C accommodated in slot portion 11c and two (a pair of) coil end portions E1 and E2 forming an end portion of segment coil 12 as protruding outward of slot portion 11c.

Figure 4:
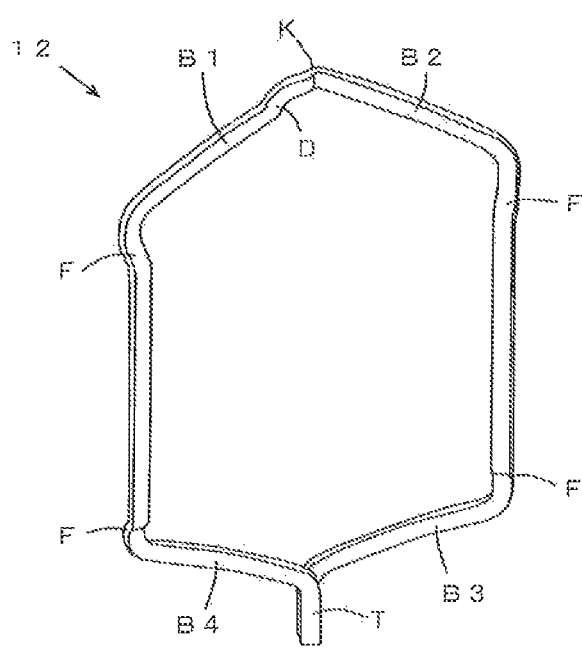
FIG. 4 is a perspective view showing a segment coil according to a first embodiment of the present invention.

As shown in FIG. 4, two (the pair of) coil end portions E1 and E2 include a coil piece B1 to a coil piece B4 which are oblique side portions formed by inclining a coil toward straight portion C with a vertex lying therebetween. More specifically, as shown in FIG. 4, upper coil end portion E1 includes a pair of coil pieces B1 and B2 formed by inclining a coil at different angles toward straight portion C with a vertex lying therebetween and lower coil end portion E2 includes a pair of coil pieces B3 and B4 formed by inclining a coil at the same angle toward straight portion C with a vertex lying therebetween.

It is noted that the "vertex" here means an outermost point of coil end portions E1 and E2, in an axial direction of annular core 11.

In the present embodiment, as shown in FIGS. 4 to 7, in coil piece B1 to be sunk radially inward of an adjacent segment coil, one concavely recessed step portion D formed by bending a coil inward of segment coil 12 in a front view is provided in a region in the vicinity of the vertex. More specifically, as shown in FIG. 6A, one recessed step portion D formed from two sides in non-parallel to and at an angle with respect to an end surface 11d of annular core 11 such that inclination on the vertex side is greater is provided in the region in the vicinity of the vertex in coil piece B1.

In the present embodiment, as will be described later, this recessed step portion D is formed by setting an angle G (shown in FIG. 6A) formed between coil piece B1 in the region in the vicinity of the vertex and a horizontal line passing through the vertex of coil end portion E1 to be greater than an angle H (shown in FIG. 6A) formed between coil piece B1 except for the region in the vicinity of the vertex and a tangential line passing through the vertex of coil end portion E1. In addition, in the present embodiment, as will be described later, recessed step portion D is formed by bending a coil in a state of elemental wire R before insulating layer Z is formed.

Figure 6A:
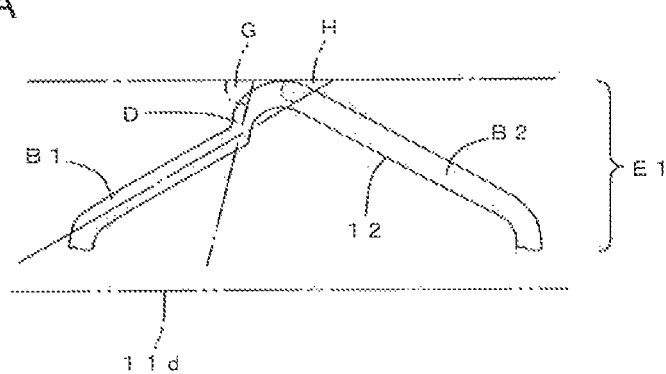
FIG. 6A is a front view showing a main portion of a coil end portion of the segment coil according to the first embodiment of the present invention.

It is noted that the "region in the vicinity of the vertex" means an area in coil piece B1 shown in FIG. 6A which is not larger than 3 times as large as a length (width) in a direction of a short side of a coil in a front view from the vertex.

Figure 6B:
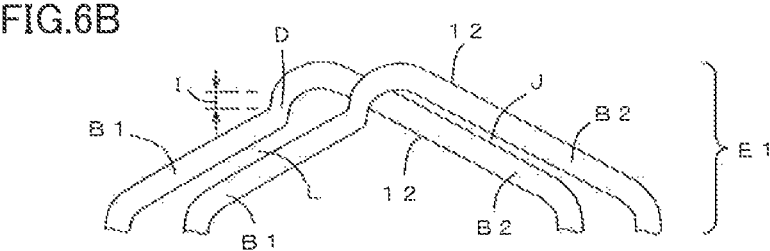
FIG. 6B is a front view showing the main portion of the coil end portion of the segment coil according to the first embodiment of the present invention.

A length I of recessed step portion D shown in FIG. 6B is at least shorter than a length (width) in the direction of the short side of the coil in the front view and preferably a minimum length allowing formation of a gap between adjacent segment coils 12 (between coil pieces B1). This is because, when length l of recessed step portion D is equal to or longer than a length (width) in the direction of the short side of the coil in the front view, angle G shown in FIG. 6A becomes greater and the coil is increased in size.

In addition, in the present embodiment, as shown in FIG. 4, tip end portions of coil pieces B3 and B4 serve as terminal portions T for connection between segment coils 12 of the same phase.

It is noted that an angle of bending of recessed step portion D is shown in FIGS. 6A and 6B to be greater than in other figures for the sake of convenience of illustration.

In the present embodiment, as shown in FIGS. 4, 7A, 7B, and 7C, at a vertex portion of coil end portion E opposite to terminal portion T, in order to avoid contact between segment coils 12 accommodated in adjacent slot portions 11c, a bent portion K formed by bending a coil radially inward of annular core 11 in a plan view is formed.

In the present embodiment, as will be described later, this bent portion K is formed by bending a coil in a state of elemental wire R before insulating layer Z is formed.

Figure 7A:
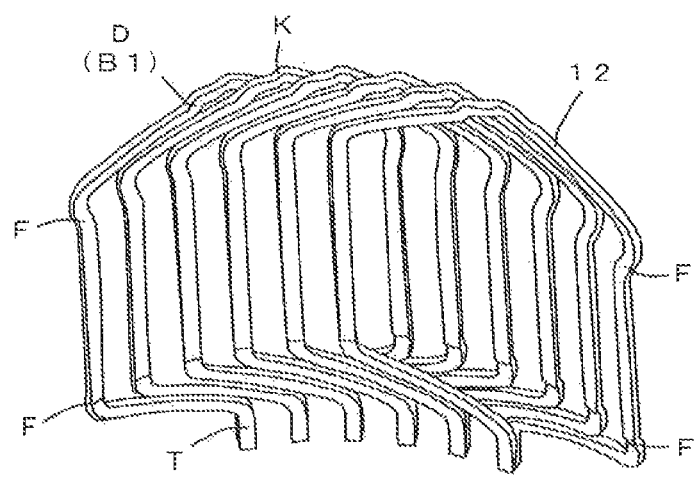
FIG. 7A is a diagram showing the segment coils according to the first embodiment of the present invention and a perspective view showing in a simplified manner, a plurality of segment coils arranged as aligned in the annular core.
Figure 7B:
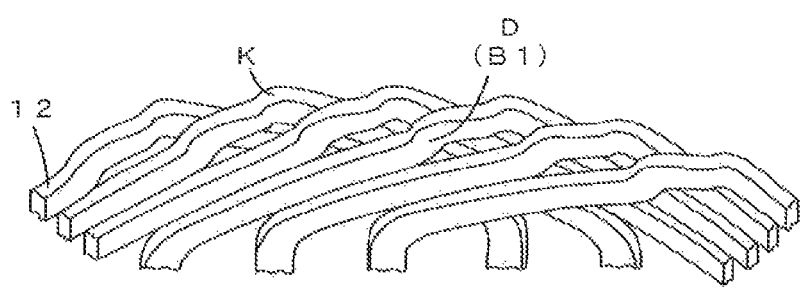
FIG. 7B is a diagram showing the segment coils according to the first embodiment of the present invention and a partial enlarged view of the coil end portions in FIG. 7A.
Figure 7C:
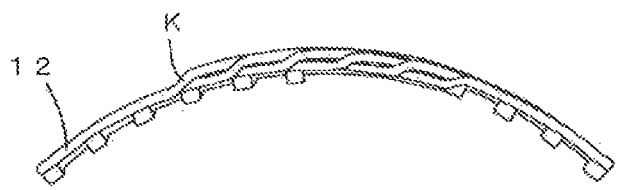
FIG. 7C is a diagram showing the segment coils according to the first embodiment of the present invention and a plan view of FIG. 7A.
Figure 8:
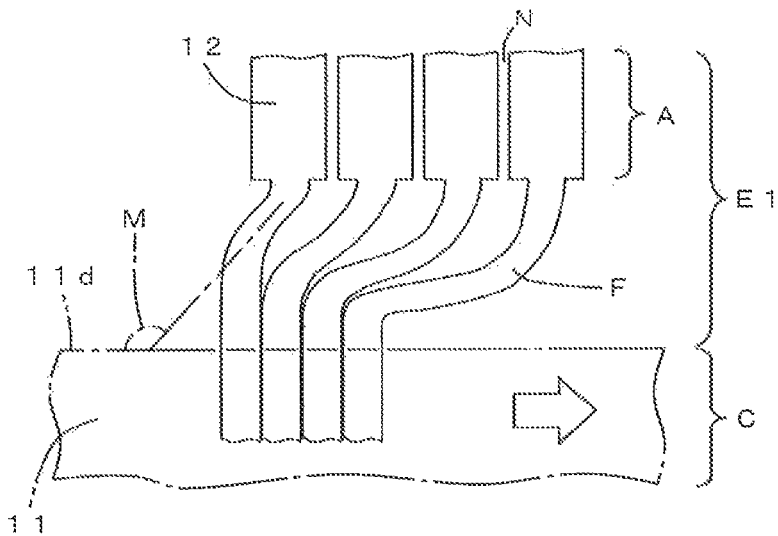
FIG. 8 is a diagram showing in a simplified manner, a state that the plurality of segment coils according to the first embodiment of the present invention are arranged as aligned in the same slot portion and a diagram schematically showing a main portion of a side surface of the segment coil.

In the present embodiment, as shown in FIGS. 4, 7A, 7B, 7C, and 8, in a region of two (the pair of) coil end portions E1 and E2 except for a thick region A which will be described later, an inclined portion F formed by inclining a coil radially outward of annular core 11 is provided. In FIG. 8, a direction shown with a hollow arrow indicates a radially outward direction.

More specifically, during assembly of segment coils 12 into annular core 11, inclined portion F formed by inclining (bending) a coil radially outward of annular core 11 is provided in the region of coil end portions E1 and E2 in the vicinity of annular core 11 and at an opposing position in a circumferential direction of annular core 11.

It is noted that "the region of coil end portions E1 and E2 in the vicinity of annular core 11" means an area in coil end portions E1 and E2 approximately 500 μm to 5 mm from end surface 11d of annular core 11 in the axial direction of annular core 11, as partially shown in FIG. 8.

As shown in FIG. 8 in a simplified manner, in adjacent segment coils 12 arranged in the same slot portion 11c, angles of inclination of coils in inclined portion F are such that an angle of inclination of segment coil 12 arranged on an outer circumferential side of annular core 11 is greater than an angle of inclination of segment coil 12 arranged on an inner circumferential side of annular core 11.

In addition, lengths in inclined portion F of adjacent segment coils 12 arranged in the same slot portion 11c are such that a length of segment coil 12 arranged on the outer circumferential side of annular core 11 is longer than a length of segment coil 12 arranged on the inner circumferential side of annular core 11.

Here, the "angle of inclination of the coil in inclined portion F" means an angle M formed between segment coil 12 forming inclined portion F and end surface 11d of annular core 11 as partially shown in FIG. 8.

Here, the "length of the coil in inclined portion F" means a length of the coil in a radial direction of annular core 11 in a portion where segment coil 12 is inclined.

In other words, as compared with inclined portion F of an segment coil arranged on the inner circumferential side of annular core 11 of adjacent segment coils 12 arranged in the same slot portion 11c, inclined portion F of a segment coil arranged on the outer circumferential side of annular core 11 is greater in an angle of bending of the coil radially outward of annular core 11 and extended (expanded) more radially outward of annular core 11.

Though not shown in the present embodiment, in the pair of coil end portions E included in one segment coil 12, an angle of inclination of the coil in inclined portion F is such that an angle of inclination in coil end portion E including terminal portion T is greater than an angle of inclination in coil end portion E not including terminal portion T.

Though not illustrated in detail in the present embodiment, for each of the pair of coil end portions E1 and E2 included in one segment coil 12, angles of inclination of the coils in inclined portion F and lengths of the coils in inclined portion F provided at positions opposed in the circumferential direction of annular core 11 are the same.

In the present embodiment, as will be described later, this inclined portion F is formed by bending the coil in the state of elemental wire R before insulating layer Z is formed.

In the present embodiment, as shown in FIGS. 3 and 7C, a shape of segment coil 12 is annularly curved in a plan view so as to extend along slot portion 11c annularly arranged in annular core 11.

In the present embodiment, as will be described later, the coil is formed as annularly curved in the state of elemental wire R before insulating layer Z is formed.

Figure 9A:
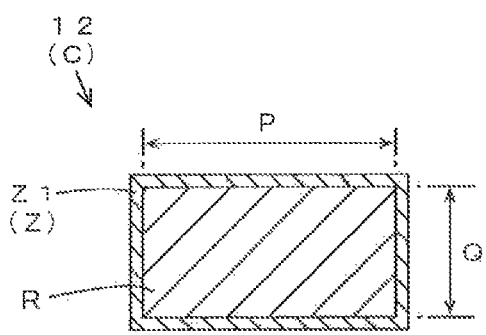
FIG. 9A is a diagram showing a cross-section of the segment coil according to the first embodiment of the present invention and a cross-sectional view of a straight portion.

Desirably, a length P in a longitudinal direction of elemental wire R shown in FIG. 9A is approximately from 2.5 mm to 5.0 mm and more preferably approximately from 3.0 mm to 4.0 mm. Desirably, a length Q in a direction of a short side of elemental wire R shown in FIG. 9A is approximately from 1.0 mm to 2.0 mm and more preferably approximately from 1.5 mm to 2.0 mm.

Figure 9B:
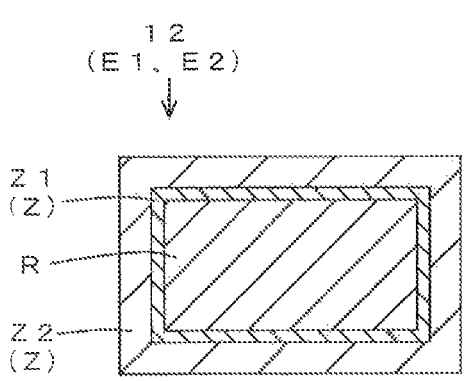
FIG. 9B is a diagram showing a cross-section of the segment coil according to the first embodiment of the present invention and a cross-sectional view of a prescribed region of the coil end portion.

In the present embodiment, as shown in FIGS. 9A, 9B, and 9C, a construction of insulating layer Z forming segment coil 12 is different between straight portion C and coil end portions E1 and E2.

More specifically, in straight portion C, as shown in FIG. 9A, insulating layer Z is formed by covering a surface of elemental wire R only with a base insulating layer Z1.

In contrast, in a prescribed region of coil pieces B2 to B4 formed from linear coils not including recessed step portion D) in coil end portion E, as shown in FIG. 9B, insulating layer Z is formed by covering the surface of elemental wire R with base insulating layer Z1 and further covering a surface of base insulating layer Z1 with an additional insulating layer Z2.

Namely, additional insulating layer Z2 is provided in a prescribed region of an oblique side portion which has not been bent.

Thus, in coil pieces B2 to B4 which implement oblique side portions, as shown in FIG. 8, thick region A formed by increasing a thickness of insulating layer Z is provided.

The "prescribed region" here means "a region of coil end portion E where adjacent segment coils 12 different in phase are proximate to each other and more specifically a region where a distance between adjacent elemental wires R different in phase in a state of elemental wire R is approximately from several μm to several hundred μm."

In the present embodiment, as will be described later, insulating layer Z is formed after a coil element B is formed by bending elemental wire R.

FIG. 8 illustrates thick region A as exaggerated for the sake of convenience of illustration.

Any elemental wire R may be employed so long as it is a normally used elemental wire forming a coil, for example, of copper.

Polyamide imide or polyimide can be employed as a material for base insulating layer Z1. A thickness of base insulating layer Z1 should only comply with a design voltage between coil turns. For example, when a design voltage is 500 V, desirably, a thickness is approximately from 15 μm to 30 μm and more suitably approximately from 15 μm to 25 μm. When a thickness is smaller than 15 μm, probability of deterioration of a film due to partial discharge or occurrence of pin holes during manufacturing increases. When a thickness exceeds 30 μm, lowering in assembly performance due to increase in heat generation or increase in outer diameter caused by lowering in space factor in slot portion 11c is caused. Pulling through a die or electrodeposition can be employed as a formation method. It is noted that base insulating layer Z1 for straight portion C and coil end portions E1 and E2 can integrally be formed in the same step.

A super engineering plastic material represented by polyamide imide or polyimide or a material in which an inorganic filler is mixed in engineering plastic can be used as a material for additional insulating layer Z2. Pulling through a die, electrodeposition, powder coating, adhesion of a tape, dipping, spray coating, insert injection molding, or extrusion can be employed as a formation method.

Since a peak voltage approximately twice as high as an input voltage is applied as a voltage between motor phases due to influence by inverter surge, for example, when a design voltage is 1000 V, desirably, a thickness of additional insulating layer Z2 is approximately from 40 μm to 200 μm and more preferably approximately from 80 μm to 120 μm. When a thickness is smaller than 40 μm, a film is deteriorated due to partial discharge. When a thickness exceeds 200 μm, a dimension increases due to increase in conductor spacing at a coil end.

Though not illustrated, an oblique side portion is subjected to prescribed bending along the circumferential direction of the stator. A form of prescribed bending along the circumferential direction of the stator is not particularly limited. For example, such bending as bending the oblique side portion at one or two or more location(s) to form substantially a polygonal shape or such bending as varying a center of a radius of curvature or a curvature can be performed.

In the present embodiment, segment coils 12 constructed as such are assembled into annular core 11 as will be described below.

Namely, as shown in FIG. 1 in a simplified manner, a prescribed number of (four in the present embodiment) segment coils 12 accommodated in the same slot portion 11c are connected at terminal portions T by welding, so that first wound coil 12a formed from four segment coils 12 is formed. As shown in FIG. 1, the U-phase is formed in such a manner that first wound coil 12a to fourth wound coil 12d each formed from four segment coils 12 are connected in series at terminal portions T and a pair of first wound coil 12a to fourth wound coil 12d connected in series is connected in parallel. Though not illustrated in detail, the V-phase and the W-phase are formed similarly to the U-phase.

As segment coils 12 forming the U-phase, the V-phase, and the W-phase thus constructed are accommodated in prescribed slot portions 11c as provisionally assembled, segment coils 12 are assembled into annular core 11 while they are arranged as aligned.

As above, stator 10 shown in FIG. 3 and partially in FIG. 5 is formed. Motor 1 is formed by combining this stator 10 with a not-shown rotor.

As shown in FIG. 1, one ends of segment coils 12 (first wound coils 12a in the present embodiment) forming respective phases of the U-phase, the V-phase, and the W-phase serve as input terminals 12U, 12V, and 12W connected to high-voltage cable 6, and the other ends (fourth wound coils 12d in the present embodiment) serve as neutral points 12UN, 12VN, and 12WN, respectively.

Segment coil 12, stator 10 including segment coils 12, and motor 1 including stator 10 according to the embodiment of the present invention constructed as such achieve the following effect.

By employing segment coil 12 formed from a rectangular wire as a coil and by annularly curving a shape of segment coil 12 in a plan view, coils can readily be arranged as aligned in slot portions 11c of annular core 1. Therefore, an operation for assembling stator 10 can be more efficient. Therefore, stator 10 and motor 1 can be high in manufacturing efficiency.

In straight portion C, only base insulating layer Z1 is formed on the surface of elemental wire R and a thickness of insulating layer Z1 is set to approximately 15 μm to 30 μm when a design voltage is 500 V. Thus, segment coil 12 can achieve an effectively improved space factor in slot portion 11c. Therefore, stator 10 and motor 1 can be high in efficiency.

In the region in the vicinity of the vertex in coil piece B1 which is a coil piece sunk radially inward of an adjacent segment coil, concavely recessed step portion D formed from two sides in non-parallel to and at an angle with respect to end surface 11d of annular core 11 such that inclination on the vertex side is greater is provided. Thus, a height of coil end portion E opposite to terminal portion T can effectively be decreased. Therefore, a size of segment coil 12 can be reduced and stator 10 and motor 1 can be reduced in size. By setting the region in the vicinity of the vertex where recessed step portion D is to be provided to be a region within a range from the vertex not greater than 3 times as large as a length (width) in the direction of the short side of the coil in a front view, a height of coil end portion E1 can further efficiently be decreased.

By providing one recessed step portion D in coil piece B1, as shown in FIG. 6B, in adjacent segment coils 12 arranged in adjacent slot portions 11c, a gap L between coil pieces B1 each including recessed step portion D can be greater than a gap J between coil pieces B2 including no recessed step portion D. Therefore, on the coil piece B1 side, adjacent segment coils 12 can effectively be prevented from coming closer to each other. Therefore, on the coil piece B1 side, only an insulating film formed from base insulating layer Z1 can effectively prevent corona discharge involved with a smaller distance between adjacent elemental wires R, and deterioration of insulating layer Z (insulating film) involved with corona discharge can effectively be prevented.

In addition, in coil piece B2 to coil piece B4 including no recessed step portion D, in a prescribed region thereof, when a design voltage is 500 V, base insulating layer Z1 having a thickness approximately from 15 μm to 30 μm is formed on the surface of elemental wire R and additional insulating layer Z2 having a thickness approximately from 40 μm to 200 μm is further formed on the surface of base insulating layer Z1, so that segment coil 12 capable of achieving effective prevention of deterioration of insulating layer Z in a region where adjacent segment coils 12 are proximate to each other, more specifically, a region where corona discharge is likely and deterioration of insulating layer Z is likely due to a distance between adjacent elemental wires R being set to approximately several μm to several hundred μm can be obtained. Therefore, segment coil 12, stator 10, and motor 1 can maintain good insulation.

A thickness of insulating layer Z can be variable by forming insulating layer Z from base insulating layer Z1 and additional insulating layer Z2. More specifically, in straight portion C where improvement in space factor is desired, a thickness of insulating layer Z can be decreased, while in a region in coil end portion E where prevention of deterioration of insulation involved with corona discharge is desired, a thickness of insulating layer Z can be increased. With such a construction, as compared with a case that insulating layer Z is integrally formed on the surface of elemental wire R in accordance with a thickness in a prescribed region in coil end portion E of which thickness should be large, manufacturing cost can effectively be suppressed.

By forming additional insulating layer Z2 only in coil pieces B2 to B4 formed from linear coils which have not been bent, additional insulating layer 72 can readily and reliably be formed and segment coil 12 can be high in manufacturing efficiency. Even in a case that additional insulating layer Z2 is provided before a coil is bent, lowering in insulation due to crack or peel-off of additional insulating layer Z2 can effectively be prevented.

By providing bent portion K at a vertex portion of coil end portion E1 on a side where no terminal portion T is provided, as shown in FIGS. 7A, 7B, and 7C, contact with adjacent segment coil 12 arranged in adjacent slot portion 11c can effectively be prevented when a plurality of segment coils 12 are arranged as aligned in slot portions 11c of annular core 11.

Inclined portion F is provided in a region of coil end portion E except for thick region A and an angle of inclination of a coil in inclined portion F of adjacent segment coils 12 arranged in the same slot is greater on the outer circumferential side than on the inner circumferential side of the core and a length of the coil in inclined portion F is longer on the outer circumferential side than on the inner circumferential side of annular core 11. Thus, even when coil end portion E is larger in thickness than straight portion C, in slot portion 11c, straight portions C in adjacent segment coils 12 arranged in the same slot portion 11c can further effectively be proximate to each other.

Namely, restriction of a distance between adjacent straight portions C in annular core 11 (in the same slot portion which is not shown) shown in FIG. 8 in a simplified manner to a thickness of thick region A in coil end portion E can be prevented. Therefore, regardless of a thickness of thick region A, adjacent straight portions C in the same slot portion 11c can be proximate to each other and a high space factor in slot portion 11c can further effectively be achieved.

Outside slot portion 11c, as shown in FIG. 8, a gap N can effectively be provided between coil end portions E of adjacent segment coils 12 arranged in the same slot portion. Therefore, outside slot portion 11c, a small gap portion where a distance between conductors tends to increase or electrolysis tends to concentrate is reduced, and an electric ratio can effectively be lowered. Thus, corona discharge in coil end portion E can effectively be suppressed. Therefore, deterioration of insulating layer Z in coil end portion E due to corona discharge can effectively be prevented and segment coil 12 and stator 10 can maintain better insulation. Therefore, segment coil 12, stator 10, and motor 1 can simultaneously achieve improvement in space factor in slot portion 11c and prevention of deterioration of insulating layer Z in particular in coil end portion E.

In the pair of coil end portions E1 and E2 provided in one segment coil 12, an angle of inclination of a coil in inclined portion F is such that an angle of inclination in coil end portion E2 including terminal portion T is greater than an angle of inclination in coil end portion E1 including no terminal portion T. Then, a large space for joint of terminal portion T can be ensured and operability during joint can be improved.

Figure 12A:
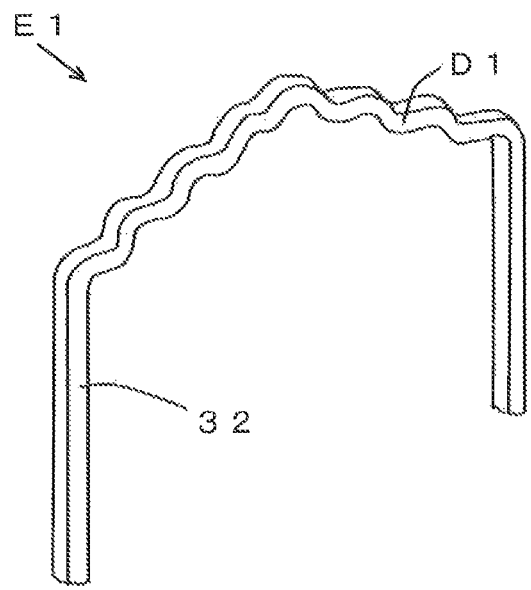
FIG. 12A is a perspective view showing a main portion of a conventional segment coil.

Namely, as shown in FIG. 12A, a segment coil 32 in which a plurality of step portions D1 are provided in coil end portion E has conventionally been available.

Such a segment coil 32 has been advantageous in that a height of coil end portion E can be decreased and hence a size of segment coil 32 can be reduced.

Such a segment coil 32, however, has been disadvantageous in that a step of forming a plurality of step portions D1 is complicated and a manufacturing process cannot be efficient. Since it has been common to form a plurality of step portions D1 after an insulating film is formed on a coil surface, deterioration of the insulating film has been likely. Even if an insulating film is formed on the coil surface after a plurality of step portions D1 are formed, treatment for insulation of the step portion is difficult and productivity has been low.

Figure 12B:
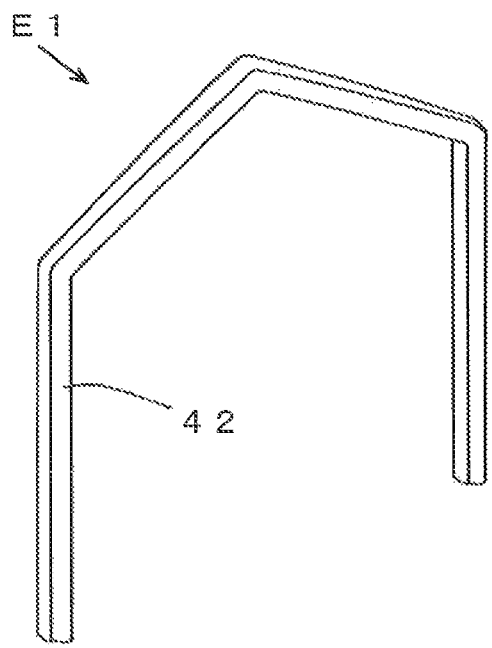
FIG. 12B is a perspective view showing a main portion of a conventional segment coil.

As shown in FIG. 12B, a segment coil 42 obtained by forming two linear coils substantially in a mountain shape without providing a step in coil end portion E1 has conventionally been available.

In such a segment coil 42, though insulation treatment has been easy, more dead space has been created in coil end portion E, a height of coil end portion E1 could not be decreased, and a size of segment coil 42 could not been reduced.

Figure 13A:
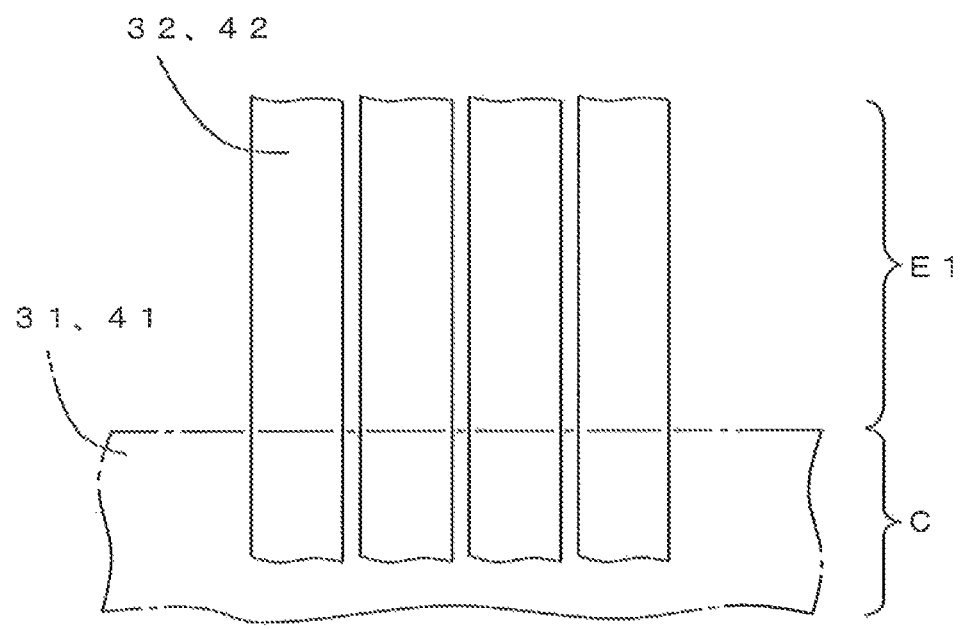
FIG. 13A is a diagram showing a conventional segment coil and a diagram schematically showing a main portion of a side surface of a plurality of segment coils arranged as aligned in the same slot portion.
Figure 13B:
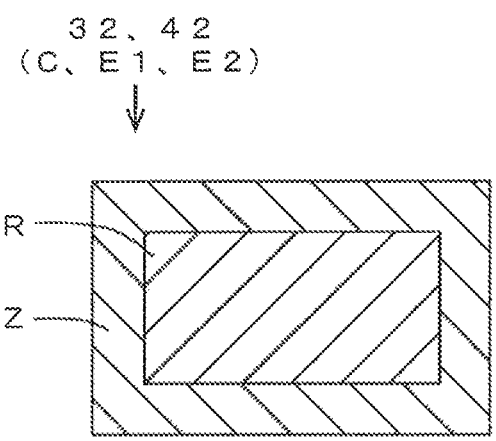
FIG. 13B is a diagram showing the conventional segment coil and a cross-sectional view of a straight portion and a coil end portion.

As shown in FIGS. 13A and 13B, generally, conventional segment coils 32 and 42 described already have had no variation in thickness as a result of formation of insulating layer Z having a uniform thickness over the entire surface of elemental wire R in straight portion C and coil end portions E1 and E2 (not shown).

Namely, in order to prevent deterioration of insulating layer Z involved with corona discharge, insulating layer Z uniform in thickness has integrally been formed on the surface of elemental wire R in accordance with a thickness of coil end portions E1 and E2 (not shown) in which a thickness of insulating layer Z should be thick.

Therefore, as a thickness of insulating layer Z is large also in straight portion C where a thickness of insulating layer Z does not have to be large, a space factor in a slot portion could not be improved and manufacturing cost could not be suppressed.

Therefore, segment coil 12, stator 10 including segment coils 12, and motor 1 including stator 10 according to the embodiment of the present invention can realize reduction in size of segment coil 12, and segment coil 12, stator 10, and motor 1 can achieve effective prevention of deterioration of insulating layer Z. Segment coil 12, stator 10, and motor 1 can achieve effective improvement in space factor in slot portion 11c.

A method of manufacturing segment coil 12 and a method of manufacturing stator 10 including segment coils 12 according to the embodiment of the present invention will now be described with reference to FIGS. 10A to 10D and 11A to 11C.

Figure 10A:
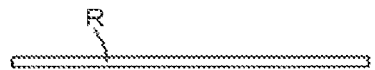
FIG. 10A is a diagram showing in a simplified manner, a method of manufacturing a segment coil according to the first embodiment of the present invention.

Initially, referring to FIG. 10A, elemental wire R formed from a rectangular wire in a state that no insulating layer is formed is prepared.

Figure 10B:
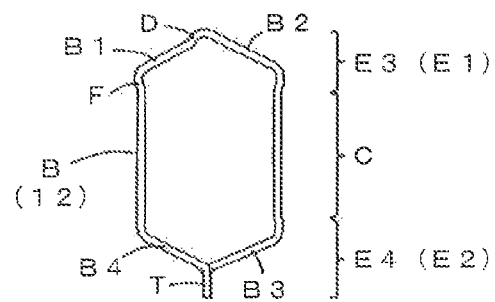
FIG. 10B is a diagram showing in a simplified manner, the method of manufacturing a segment coil according to the first embodiment of the present invention.

Then, referring to FIG. 10B, by bending elemental wire R formed from a rectangular wire substantially in a U shape with a not-shown jig in a coil element forming step, elemental wire R is worked to coil element B which forms a shape of what is called a segment coil.

Figure 11A:
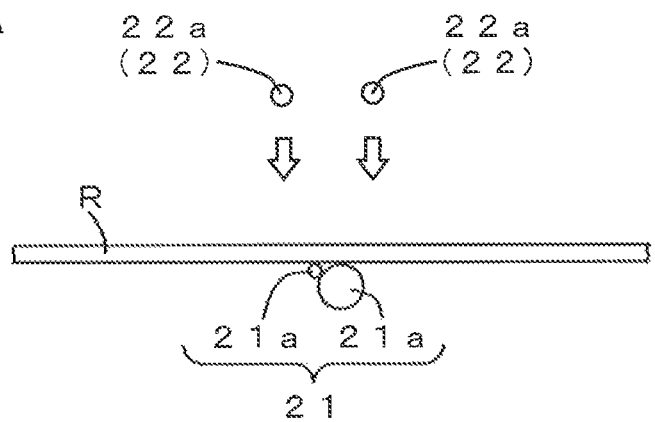
FIG. 11A is a diagram showing in a simplified manner, a part of a coil element forming step in the method of manufacturing a segment coil according to the first embodiment of the present invention.
Figure 11B:
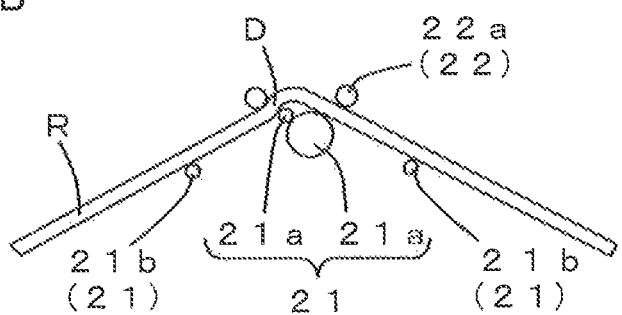
FIG. 11B is a diagram showing in a simplified manner, a part of the coil element forming step in the method of manufacturing a segment coil according to the first embodiment of the present invention.
Figure 11C:
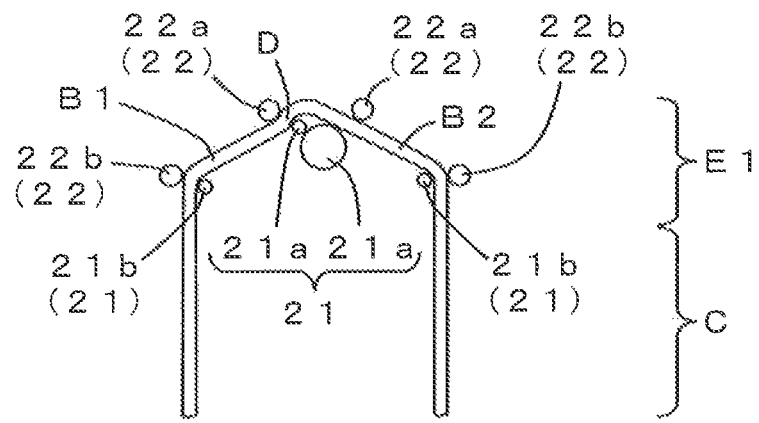
FIG. 11C is a diagram showing in a simplified manner, a part of the coil element forming step in the method of manufacturing a segment coil according to the first embodiment of the present invention.

More specifically, as shown in FIGS. 11A, 11B, and 11C, in a coil piece forming step and a step portion forming step in the coil element forming step, a first pressing jig 22a in a shape of a pair of circles serving as pressing means 22 is arranged above elemental wire R while elemental wire R is placed on a first fixing pin 21a in a shape of a pair of circles serving as pressing means 21.

Here, as shown in FIG. 11A, in the pair of first fixing pins 21a, a diameter of first fixing pin 21a on a side where concavely recessed step portion D is subsequently formed (on the left side in the drawing) should be smaller than a diameter of the other first fixing pin 21a (on the right side in the drawing). Namely, in coil piece B1, such a pair of fixing pins 21a that angle G (shown in FIG. 6A) formed between coil piece B1 in the region in the vicinity of the vertex and the horizontal line passing through the vertex of coil end portion E1 will be greater than angle H (shown in FIG. 6A) formed between coil piece B1 except for the region in the vicinity of the vertex and the horizontal line passing through the vertex of coil end portion E (a pin diameter) should be employed. In addition, such a pair of fixing pins 21a as allowing formation of recessed step portion D formed from two sides in non-parallel to and at an angle with respect to end surface 11d of annular core 11 (a pin diameter) as shown in FIG. 6A should be employed.

As shown in FIG. 11B, first pressing jig 22a is moved downward such that elemental wire R is pressed and bent along first fixing pin 21a.

Then, as shown in FIGS. 11B and 11C, a second fixing pin 21b in a shape of a pair of circles and a second pressing jig 22b in a shape of a pair of circles are used to again press and bend elemental wire R.

Thus, as shown in FIG. 11C, a coil end portion E3 including a pair of coil pieces B1 and B2 formed by inclining a coil at different angles toward straight portion C with the vertex lying therebetween is formed. In the region in the vicinity of the vertex in coil piece B1, concavely recessed step portion D formed by bending a coil inward of coil element B in a front view and formed from two sides in non-parallel to and at an angle with respect to end surface 11d of annular core 11 is formed. Namely, coil pieces B1 and B2 asymmetric with respect to the vertex are formed.

Thereafter, though not shown, a coil end portion E4 including coil pieces B3 and B4 is formed with the use of a pressing jig and a fixing pin.

Then, though not shown, in a bent portion forming step in the coil element forming step, bent portion K formed by bending a coil radially inward of a stator core in a plan view is formed with the use of a bending jig at the vertex portion of coil end portion E3 on a side where no terminal portion T is provided, in coil end portion E of coil element B.

Then, though not shown, in an inclined region forming step in the coil element forming step, inclined portion F formed by inclining a coil radially outward of annular core 11 is formed with the use of a bending jig in a prescribed region in coil end portions E3 and E4 of coil element B.

In this inclined region forming step, inclined portion F of adjacent segment coils 12 to subsequently be arranged in the same slot is formed such that a coil in inclined portion F arranged on the outer circumferential side of annular core 11 is greater in angle of inclination and in length than segment coil 12 arranged on the inner circumferential side of annular core 11.

In addition, inclined portion F is formed such that an angle of inclination of a coil in inclined portion F of the two (the pair of) coil end portions E3 and E4 included in one coil element B is greater in coil end portion E4 including terminal portion T than in coil end portion E3 including no terminal portion T.

Then, though not shown, coil element B is annularly curved in a plan view with the use of a jig so as to extend along a shape of slot portion 11c annularly arranged in stator 10.

Coil element B shown in FIG. 10B is formed as above.

Then, though not shown, in a base insulating layer forming step in the insulating layer forming step, in coil element B, the entire surface except for a region to serve as terminal portion T is covered with an insulating substance to a uniform thickness, so as to integrally form base insulating layer Z1 having a uniform thickness on the surface of coil element B. Here, when a design voltage is 500 V, desirably, base insulating layer Z1 has a thickness approximately from 15 μm to 30 μm and more preferably approximately from 15 μm to 25 μm.

Then, though not shown, in an additional insulating layer forming step in the insulating layer forming step, additional insulating layer 22 is formed by covering a prescribed region of coil piece B2 to coil piece B4 in coil end portion E1 of coil element B with an insulating substance the same as that for base insulating layer Z1 to a uniform thickness. Thick region A (not shown) is thus formed in a prescribed region of coil piece B2 to coil piece B4.

Here, when a design voltage is 1000 V, desirably, additional insulating layer Z2 has a thickness approximately from 40 μm to 200 μm and more preferably approximately from 80 μm to 120 μm.

Through the steps above, insulating layer Z is formed on the surface of coil element B. Segment coil 12 according to the embodiment of the present invention is thus formed.

Figure 10C:
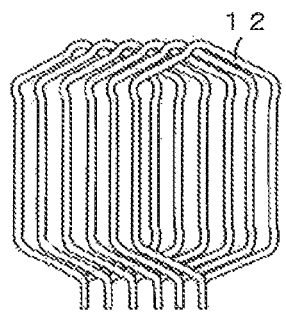
FIG. 10C is a diagram showing in a simplified manner, the method of manufacturing a segment coil according to the first embodiment of the present invention.
Figure 10D:
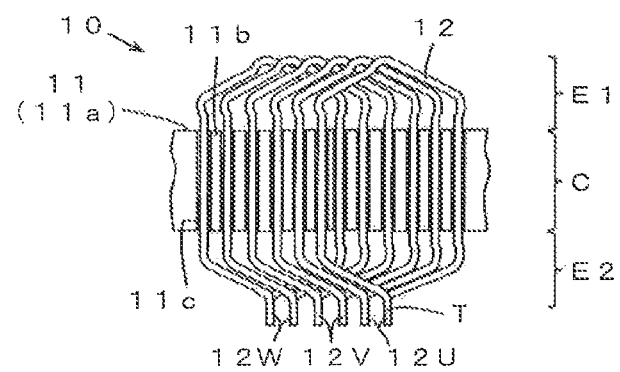
FIG. 10D is a diagram showing in a simplified manner, the method of manufacturing a segment coil according to the first embodiment of the present invention.

Then, as shown in FIG. 10C in a simplified manner, segment coils 12 forming the U-phase, the V-phase, and the W-phase are provisionally assembled.

Then, as shown in FIG. 101D in a simplified manner, segment coils 12 in a provisionally assembled state are assembled into slot portions 11c of annular core 11.

Then, though not shown, terminal portions T of segment coils 12 forming the U-phase, the V-phase, and the W-phase, respectively and assembled in the same slot portion 11c are joined by welding, so as to form first wound coil 12a to fourth wound coil 12d in respective phases.

Then, though not shown, by connecting in series first wound coil 12a to fourth wound coil 12d in each phase with a jumper line, a pair of first wound coil 12a to fourth wound coil 12d is connected in parallel.

Through the steps above, stator 10 according to the embodiment of the present invention is formed.

The method of manufacturing segment coil 12 and the method of manufacturing stator 10 including segment coils 12 according to the embodiment of the present invention as such achieve the following effect.

By employing segment coil 12 formed from a rectangular wire as a coil, the method of manufacturing stator 10 can achieve an effectively improved space factor in slot portion 11c of annular core 11.

In straight portion C, only base insulating layer Z1 is formed on the surface of elemental wire R, and when a design voltage is 500 V, insulating layer Z1 has a thickness approximately from 15 µm to 30 µm. Thus, segment coil 12 can achieve an effectively improved space factor in slot portion 11c. Therefore, stator 10 and motor 1 can be high in efficiency.

By performing the insulating layer forming step after the coil element forming step, no stress from working such as bending is applied to insulating layer Z. Therefore, deterioration of insulating layer Z in particular in a stage of manufacturing segment coil 12 can effectively be prevented. Therefore, the method of manufacturing segment coil 12 can maintain good insulation and achieve good yield. In addition, the method of manufacturing stator 10 can maintain good insulation. Since working of coil end portion E is facilitated, the method of manufacturing segment coil 12 and stator 10 allows easy increase in the number of turns of a coil in the same slot portion 11c.

Concavely recessed step portion D formed from two sides in non-parallel to and at an angle with respect to end surface 11d of annular core 11 such that inclination on the vertex side is greater is provided in the region in the vicinity of the vertex in coil piece B1 which is a coil piece to be sunk radially inward of an adjacent segment coil. Thus, a height of coil end portion E1 opposite to terminal portion T can effectively be decreased. Therefore, the method of manufacturing segment coil 12 and stator 10 can achieve reduction in size.

Recessed step portion D is provided in coil piece B1. Thus, as shown in FIG. 6B, in adjacent segment coils 12 arranged in adjacent slot portions 11c, gap L between coil pieces B1 each including recessed step portion D can be greater than gap J between coil pieces B2 including no recessed step portion D. Therefore, adjacent segment coils 12 being proximate to each other on the coil piece B1 side can effectively be prevented. Therefore, on the coil piece B1 side, even an insulating film formed only from base insulating layer Z1 can achieve effective prevention of corona discharge involved with decrease in distance between adjacent elemental wires R and deterioration of insulating layer Z involved with corona discharge.

In addition, in a prescribed region of coil pieces B2 to B4 including no recessed step portion D, when a design voltage is 1000 V, base insulating layer Z1 having a thickness approximately from 15 µm to 30 µm is formed on the surface of elemental wire R and additional insulating layer Z2 having a thickness approximately from 80 µm to 120 µm is further formed on the surface of base insulating layer Z1. Thus, segment coil 12 can achieve effective prevention of deterioration in insulating layer Z in a region where adjacent segment coils 12 are proximate to each other, more specifically, in a region where corona discharge is likely and deterioration of insulating layer Z is likely due to a distance between adjacent elemental wires R being set to approximately several µm to several hundred µm. Therefore, the method of manufacturing segment coil 12 and stator 10 can maintain good insulation.

A thickness of insulating layer Z can be variable by forming insulating layer Z from base insulating layer Z1 and additional insulating layer 72. More specifically, in straight portion C where improvement in space factor is desired, a thickness of insulating layer Z can be decreased, while in a region in coil end portion E where prevention of deterioration of insulation involved with corona discharge is desired, a thickness of insulating layer Z can be increased. With such a construction, as compared with a case that insulating layer Z is integrally formed on the surface of elemental wire R in accordance with a thickness in a prescribed region in coil end portion E of which thickness should be large, manufacturing cost can effectively be suppressed.

By forming additional insulating layer Z2 only in coil pieces B2 to B4 formed from linear coils including no recessed step portion D, formation of additional insulating layer Z2 can be facilitated and the method of manufacturing segment coil 12 and stator 10 can be high in manufacturing efficiency.

By providing bent portion K at a vertex portion of coil end portion E1 on a side where no terminal portion T is provided, as shown in FIGS. 7A, 7B, and 7C, contact with adjacent segment coil 12 arranged in adjacent slot portion 11c can effectively be prevented when a plurality of segment coils 12 are arranged as aligned in slot portions 11c of annular core 11.

In addition, inclined portion F is provided in a region of coil end portion E except for thick region A and an angle of inclination of a coil in inclined portion F in adjacent segment coils 12 arranged in the same slot portion 11c is greater on the outer circumferential side than on the inner circumferential side of annular core 11 and a length of the coil in inclined portion F is longer on the outer circumferential side than on the inner circumferential side of annular core 11. Thus, even when coil end portion E is larger in thickness than straight portion C, in slot portion 11c, straight portions C in adjacent segment coils 12 arranged in the same slot portion 11c can further effectively be proximate to each other.

Namely, restriction of a distance between adjacent straight portions C in stator 10 (in the same slot portion which is not shown) shown in FIG. 8 in a simplified manner to a thickness of thick region A in coil end portions E1 and E2 can be prevented. Therefore, regardless of a thickness of thick region A, adjacent straight portions C in the same slot portion 11c can be proximate to each other and a high space factor in slot portion 11c can further effectively be achieved.

Outside slot portion 11c, as shown in FIG. 8, gap N can effectively be provided between coil end portions E1, E2 (not shown) of adjacent segment coils 12 arranged in the same slot portion 11c. Therefore, outside slot portion 11c, a small gap portion where a distance between conductors tends to increase or electrolysis tends to concentrate decreases and a dielectric constant can effectively be lowered. Thus, corona discharge in coil end portions E1 and E2 (not shown) can effectively be suppressed. Therefore, deterioration of insulating layer Z in coil end portion E due to corona discharge can effectively be prevented and the method of manufacturing segment coil 12 and stator 10 can maintain better insulation. Therefore, the method of manufacturing segment coil 12 and stator 10 can simultaneously achieve improvement in space factor in slot portion 11c and prevention of deterioration of insulating layer Z in particular in coil end portion E.

In the two (the pair of) coil end portions E1 and E2 provided in one segment coil 12, an angle of inclination of a coil in inclined portion F is such that an angle of inclination in coil end portion E2 including terminal portion T is greater than an angle of inclination in coil end portion E1 including no terminal portion T. Then, a large space for joint of terminal portion T can be ensured and operability during joint can be improved.

Though base insulating layer Z1 and additional insulating layer Z2 are formed of the same insulating substance in the present embodiment, limitation thereto is not necessarily intended and base insulating layer Z1 and additional insulating layer Z2 may be formed of different insulating substances. For example, base insulating layer Z1 can be formed of an insulating substance more inexpensive than additional insulating layer Z2. Thus, segment coil 12 can achieve further suppressed manufacturing cost.

In the present embodiment, as shown in FIG. 9B, though additional insulating layer Z2 is provided around the entire perimeter of segment coil 12 in a prescribed region of segment coil 12, limitation thereto is not necessarily intended and additional insulating layer Z2 may be provided only in a part of the outer perimeter of segment coil 12 so long as additional insulating layer Z2 is provided in a region of a pair of coil end portions E1 and E2 where adjacent coils 12 are proximate to each other, more specifically, a portion where a distance between adjacent elemental wires R in a state of elemental wire R is approximately from several μm to several hundred μm.

In the present embodiment, though additional insulating layer Z2 is provided only in coil pieces B2 to B4 formed from linear coils except for coil piece B1 including recessed step portion D, limitation thereto is not necessarily intended and a position where additional insulating layer Z2 is to be provided can be changed as appropriate in accordance with a region where adjacent segment coils 12 different in phase are proximate to each other.

It is noted that additional insulating layer Z2 is desirably provided in an oblique side portion except for a portion in the vicinity of the peak portion of the mountain shape and the portions in the vicinity of the opposing mountain-foot portions and/or in the straight portion extending from the slot. Specifically, it is desirably provided in coil pieces B2 to B4 representing the oblique side portion and/or in the straight portion extending from slot portion 11c.

Namely, in order to prevent crack or peel-off in additional insulating layer Z2, additional insulating layer Z2 is preferably provided in a prescribed region of a portion which has not been bent or a portion bent at a large radius of curvature.

For example, in a case that coil end portions E1 and E2 are formed in a mountain shape, three edgewise bent portions forming a mountain shape, an edgewise bent portion forming step portion D provided in the vicinity of the peak portion of the mountain shape, and flatwise bent portions in the vicinity of the mountain-foot portions of the mountain shape (lower bent portions in inclined portions F) representing transition from the oblique side portions of the mountain shape (coil pieces B1 to B4) to straight portions C accommodated in slot portion 11c are bent at a radius of curvature 0.5 to 3 times as large as that for a long side in a rectangular cross-section of each coil. The oblique side portions (portions in coil pieces B1 to B4) except for the bent portions are subjected to flatwise bending at a radius of curvature 20 to 60 times as large as that for a long side in the rectangular cross-section of each coil. Therefore, additional insulating layer Z2 is desirably formed in coil pieces B2 to B4 representing the oblique side portions except for the portion in the vicinity of the peak portion of the mountain shape and the portions in the vicinity of the opposing mountain-foot portions and/or in the straight portion extending from slot portion 11c.

Thus, additional insulating layer Z2 can readily and reliably be formed and lowering in insulation due to crack or peel-off of additional insulating layer Z2 can effectively be prevented.

It is noted that "edgewise bending" here means such bending as bending a short side in a rectangular cross-section of a coil and "flatwise bending" means such bending as bending a long side in a rectangular cross-section of a coil.

Though inclined portions F are provided at respective positions opposed in the circumferential direction of annular core 11 in the two (the pair of) coil end portions E1, E2 in the present embodiment, limitation thereto is not necessarily intended.

Though four inclined portions F formed in one segment coil 12 are the same in angle of inclination and length of segment coil 12 in the present embodiment, limitation thereto is not necessarily intended and an angle of inclination and a length of segment coil 12 may each be different.

It is noted that, in forming stator 10, an angle of inclination of a coil in inclined portion F in adjacent segment coils 12 arranged in the same slot portion 11c should be such that an angle of inclination of segment coil 12 arranged on the outer circumferential side of annular core 1 is greater than an angle of inclination of segment coil 12 arranged on the inner circumferential side of annular core 11 and a length of inclined portion F should be such that a length of segment coil 12 arranged on the outer circumferential side of annular core 11 is longer than a length of segment coil 12 arranged on the inner circumferential side of annular core 11.

Coil end portion E may be provided with no inclined portion F.

The number of segment coils 12 forming the U-phase, the V-phase, and the W-phase, a shape of segment coil 12, a position where thick region A is formed, a shape of annular core 1, or a construction of motor 1 is not limited to that in the present embodiment and can be changed as appropriate.

Though recessed step portion D is formed only in coil end portion E1 on a side where no terminal portion T is provided in the present embodiment, limitation thereto is not necessarily intended and recessed step portion D may be provided also in coil end portion E2 on a side where terminal portion T is provided.

Though the insulating layer forming step is performed after the coil element forming step in the embodiment of the present invention, limitation thereto is not necessarily intended. For example, elemental wire R is prepared, the base insulating layer forming step is initially performed, thereafter the coil element forming step is performed, and the additional insulating layer forming step can further subsequently be performed. Thus, an insulating material which is in good balance between insulation performance and cost can be selected.

A segment coil according to a second embodiment of the present invention will now be described with reference to FIGS. 14 to 18.

Since the segment coil according to the second embodiment of the present invention is similar in construction to the already described segment coil except for a construction of an additional insulating layer described below, detailed description of a basic construction of the segment coil will not be provided.

Figure 14:
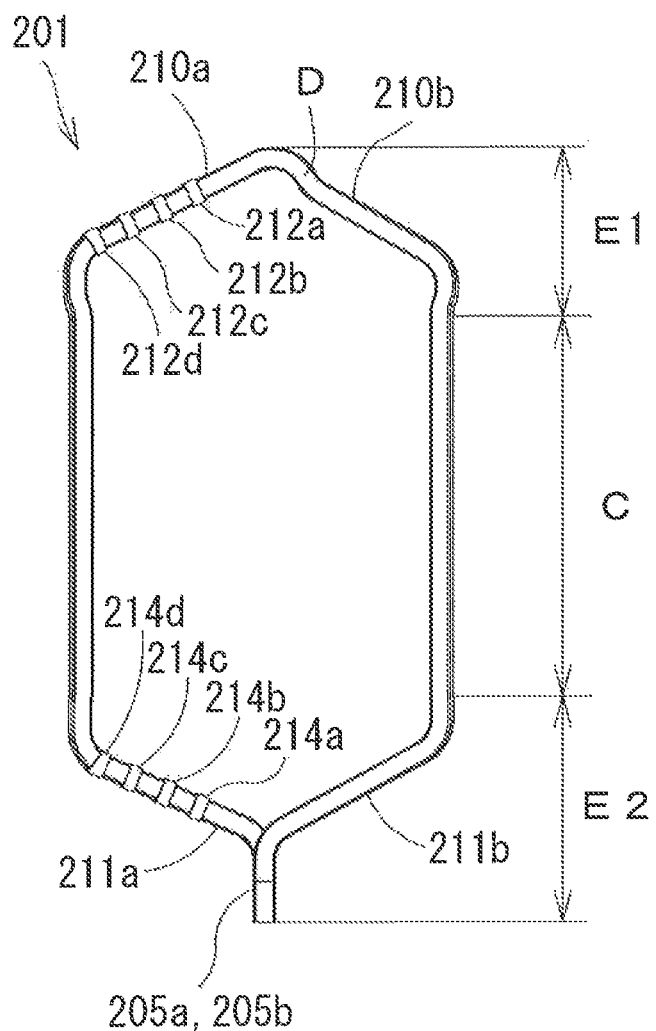
FIG. 14 is a front view showing a segment coil according to a second embodiment of the present invention.

As shown in FIG. 14, a segment coil 201 in a representative form attached to each slot portion 11c of stator 10 as shown in FIG. 3 is formed substantially in a hexagonal shape including a pair of straight portions C accommodated in slot portion 11c and a pair of coil end portions E1 and E2 extending from opposing end portions in an axial direction of slot portion 11c and having a mountain shape. In coil end portion E2, adjacent segment coils attached to the same slot portion 11c are connected and connection to a segment coil attached to another slot is also made. For connection to a segment coil attached to another slot, segment coils attached on an innermost side and an outermost side in a radial direction of the stator are provided with coil end portions in a plurality of forms in accordance with a connection pattern. The description below is given for segment coil 201 in a form shown in FIG. 14 for facilitating understanding.

One coil end portion E1 is formed in a mountain shape which connects in a bridging manner, a pair of straight portions C accommodated in prescribed slot portion 11c. The other coil end portion E2 is provided with terminal portions 205a and 205b for connection to a segment coil adjacently accommodated in slot portion 11c and a mountain shape is formed in cooperation with a coil end portion of a connected segment coil.

Figure 15:
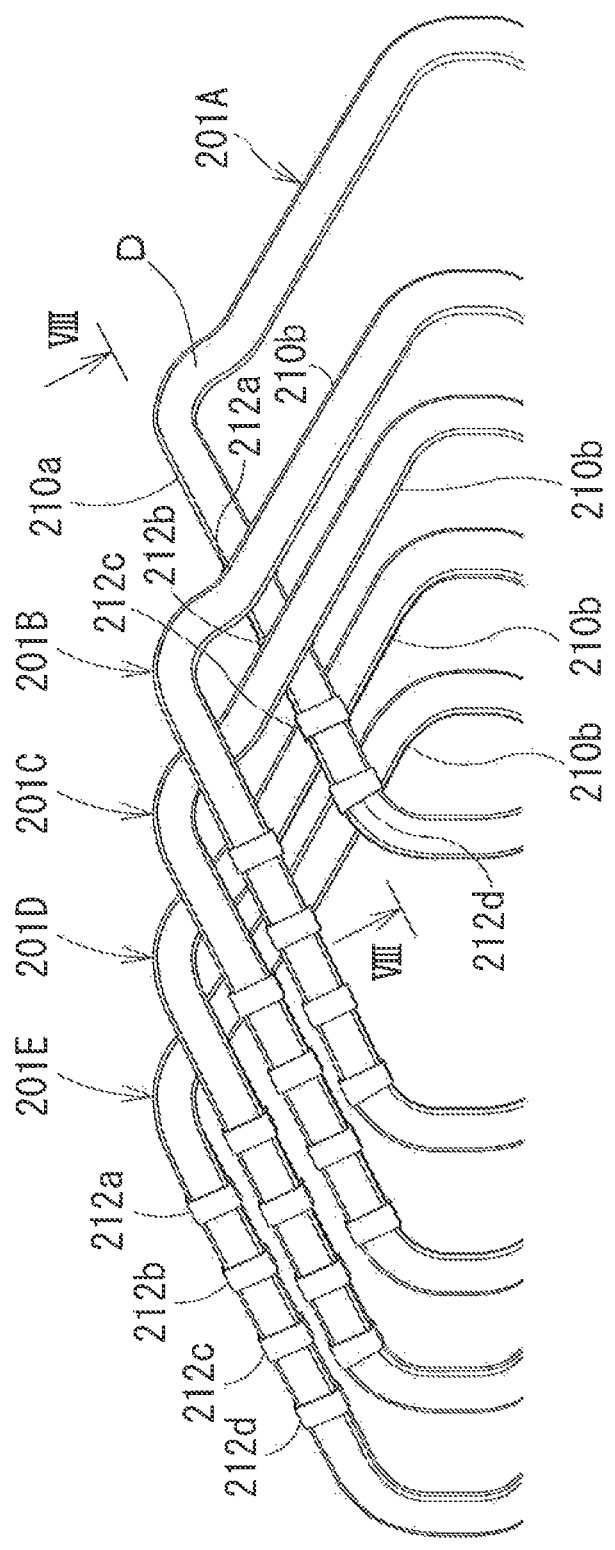
FIG. 15 is a front view of a main portion showing a state of facing between one segment coil and a segment coil arranged adjacently thereto.
Figure 17:
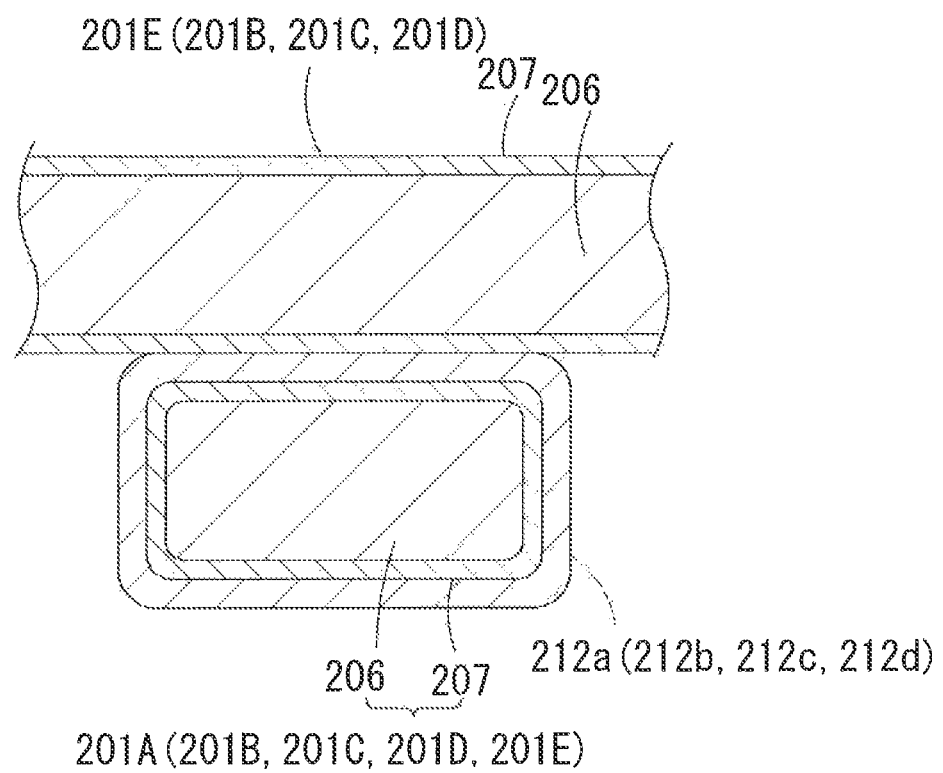
FIG. 17 is a cross-sectional view along the line XI-XI in FIG. 16.

As shown in FIGS. 15 and 17, in segment coils 201A to 201E, a base insulating layer 207 is formed around the entire outer perimeter except for terminal portions 205a and 205b of a conductive elemental wire 206 having a rectangular cross-section. Base insulating layer 207 is formed to an even thickness over the entire outer perimeter of a coil material 206 to a thickness from 5 to 25 μm with the use of a material resistant to bending such as polyimide.

As shown in FIG. 14, in one oblique side portion 210a, 211a of coil end portion E1, E2 formed in the mountain shape in segment coil 201 according to the present embodiment, additional insulating layers 212a, 212b, 212c, 212d, 214a, 214b, 214c, and 214d are formed. It is noted that an oblique side portion where an additional insulating layer is to be provided may be oblique side portions 210b and 211b on the opposite side. An additional insulating layer may be provided in different oblique side portions in upper and lower coil end portions E1 and E2. It is noted that an additional insulating layer is provided in an oblique side portion on the same side of each segment coil in one coil end portion.

As shown in FIG. 17, additional insulating layers 212a, 212b, 212c, 212d, 214a, 214b, 214c, and 214d according to the present embodiment are formed by applying in stack an insulating polyamide imide resin paint material on base insulating layer 207 around the entire perimeter of a prescribed width to a prescribed thickness. Though a thickness of additional insulating layers 212a, 212b, 212c, 212d, 214a, 214b, 214c, and 214d is not particularly limited, for example, they can be formed to a thickness from 50 to 200 μm depending on a voltage difference between segment coils facing each other.

In the present embodiment, among coils which form phases of a three-phase AC motor, four coils are disposed in a state abutting to or proximate to oblique side portions 210a and 210b in the mountain shape in coil end portion E1 of segment coils 201A to 201E including segment coils arranged on the radially innermost side and on the radially outermost side of stator 10 shown in FIG. 3.

FIG. 15 is a front view schematically representing one segment coil 201A and segment coils 201B, 201C, 201D, and 201E facing one oblique side portion 210a of this segment coil 201A as extracted.

As shown in this figure, respective right oblique side portions 210b of four adjacent segment coils 201B, 201C, 201D, and 201E face left oblique side portion 210a in the figure of one segment coil 201A, as intersecting at prescribed intervals.

In the present embodiment, in left oblique side portion 210a of one segment coil 201A, additional insulating layers 212a to 212d are formed in a portion which other segment coils 201B, 201C, 201D, and 201E face.

Figure 16:
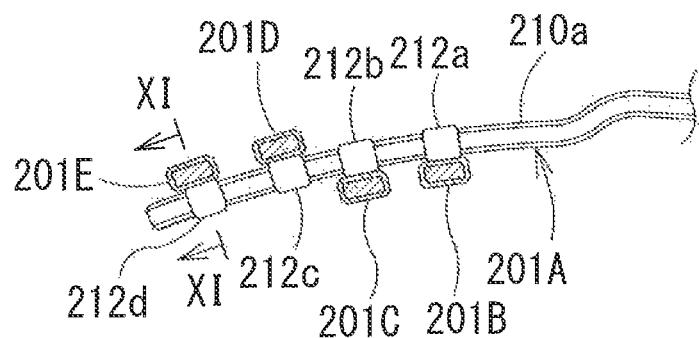
FIG. 16 is a cross-sectional view along the line VIII-VIII in FIG. 15.

FIG. 16 is a cross-sectional view along the line VIII-VIII in FIG. 15. As shown in FIG. 16, in the present embodiment, additional insulating layers 212a, 212b, 212c, and 212d are provided in left oblique side portion 210a of coil end portion E1, E2 in the mountain shape of each segment coil. Additional insulating layers 212a, 212b. 212c, and 212d expand a gap from facing segment coils 201B, 201C, 201D, and 201E so that partial discharge between segment coils facing each other in coil end portion E1 can be prevented.

Furthermore, additional insulating layers 212a to 212d are provided only in segment coil 201A, on one facing side. Therefore, in a whole coil forming a stator, a region where additional insulating layers 212a to 212d are provided can be small. Partial discharge can efficiently be prevented and a material necessary for providing additional insulating layers 212a to 212d can be reduced, to thereby reduce manufacturing cost. In addition, a weight of a motor can also be reduced.

Since no additional insulating layer is formed in a portion accommodated in slot portion 11c, a large cross-sectional area of a conductor in slot portion 11c can be set. Therefore, a space factor in slot portion 11c can be improved and efficiency of a motor can be enhanced.

In segment coils 201B and 201E arranged on the radially outermost side and on the radially innermost side of the stator, respectively, an adjacent segment coil is arranged only on one side in the radial direction and coupled to a segment coil of the same phase attached to another slot. Therefore, depending on design, a portion to face an adjacent segment coil is different. Therefore, an additional insulating layer should only be provided in a portion facing another segment coil, depending on a construction of a segment coil in stator 10.

Though additional insulating layers are provided among all facing segment coils in coil end portions E1 and E2 in the present embodiment, additional insulating layers can also be provided only in a portion where segment coils belonging to different phases great in voltage difference face each other. Thus, a region where an additional insulating layer is provided can further be reduced. Since an additional insulating layer is provided between segment coils belonging to different phases where partial discharge is likely, partial discharge can more effectively be prevented.

Figure 18:
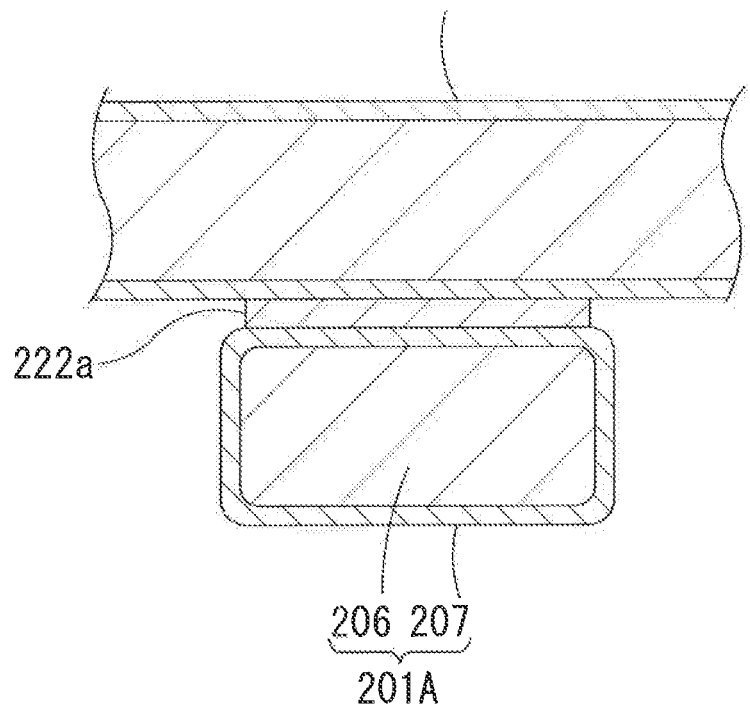
FIG. 18 is a diagram showing a second example of an additional insulating layer and a cross-sectional view corresponding to FIG. 17.

Though additional insulating layers 212a to 212d are provided to surround a perimeter of one segment coil 201A with a prescribed width in the embodiment shown in FIG. 17, they can be provided only in a surface where other segment coils 201B to 201E face segment coil 201A. For example, as shown in FIG. 18, in one segment coil 201A, an additional insulating layer 112a can be formed only in radially inner and outer surfaces of stator 10 where other segment coils 201B to 201E face segment coil 201A. By adopting this construction, a region where an additional insulating layer is to be provided can further be reduced.

Though additional insulating layers 212a to 212d are formed of an insulating resin paint material in the present embodiment, limitation thereto is not intended. For example, additional insulating layers 212a to 212d can be formed of an insulating resin tube material. For example, a heat-shrinkable tube material such as an insulating resin tube material (trade name Sumitube) manufactured by Sumitomo Electric Industries, Ltd. can be adopted as the insulating tube material.

Alternatively, additional insulating layers 212a to 212d can be formed of an insulating resin tape material. For example, an insulating resin tape material (trade name Kapton tape) manufactured by Permacel can be adopted.

An area where an additional insulating layer is to be provided is not particularly limited either. Though additional insulating layers 212a to 212d are formed only in a portion in one oblique side portion 210a of one segment coil 201A which other segment coils 201B to 201D face in the present embodiment, they can also be formed in entire one oblique side portion 210a.

Each of segment coils 201A to 201E is formed by bending in advance a conductor having a large cross-sectional area. When an additional insulating layer is provided at a site of bending before bending, crack or peel-off may take place in the additional insulating layer and insulation may lower. Even after bending, it may be difficult to provide an additional insulating layer at a bent site. For example, it is difficult to form an additional insulating layer in a bent portion with the use of a tape material or a tube material. Therefore, in forming an additional insulating layer of a film material or a tube material, an additional insulating layer is preferably provided in a portion which is not bent.

A segment coil according to a third embodiment of the present invention will now be described with reference to FIGS. 19 to 21.

Since the segment coil according to the third embodiment of the present invention is similar in construction to the already described segment coil except for a construction of an insulating layer and a semiconductive layer described below, detailed description of a basic construction of the segment coil will not be provided.

Figure 19:
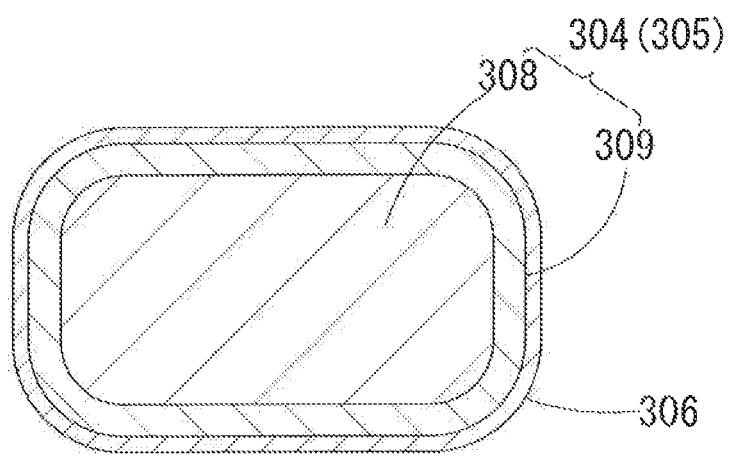
FIG. 19 is a cross-sectional view showing a segment coil according to a third embodiment of the present invention.

As shown in FIG. 19, in segment coils 304 and 305 according to the present embodiment, an insulating layer 309 is provided on an outer peripheral surface of a conductive elemental wire 308 having a rectangular cross-section.

In addition, in the present embodiment, a semiconductive layer 306 is provided in a prescribed region of coil end portions E1 and E2 extending from slot portion 11c of segment coils 304 and 305 provided with insulating layer 309, and semiconductive layers 306 and 306 of segment coils 304 and 305 arranged in proximity and belonging to different phases are in contact at at least one point P.

Figure 21:
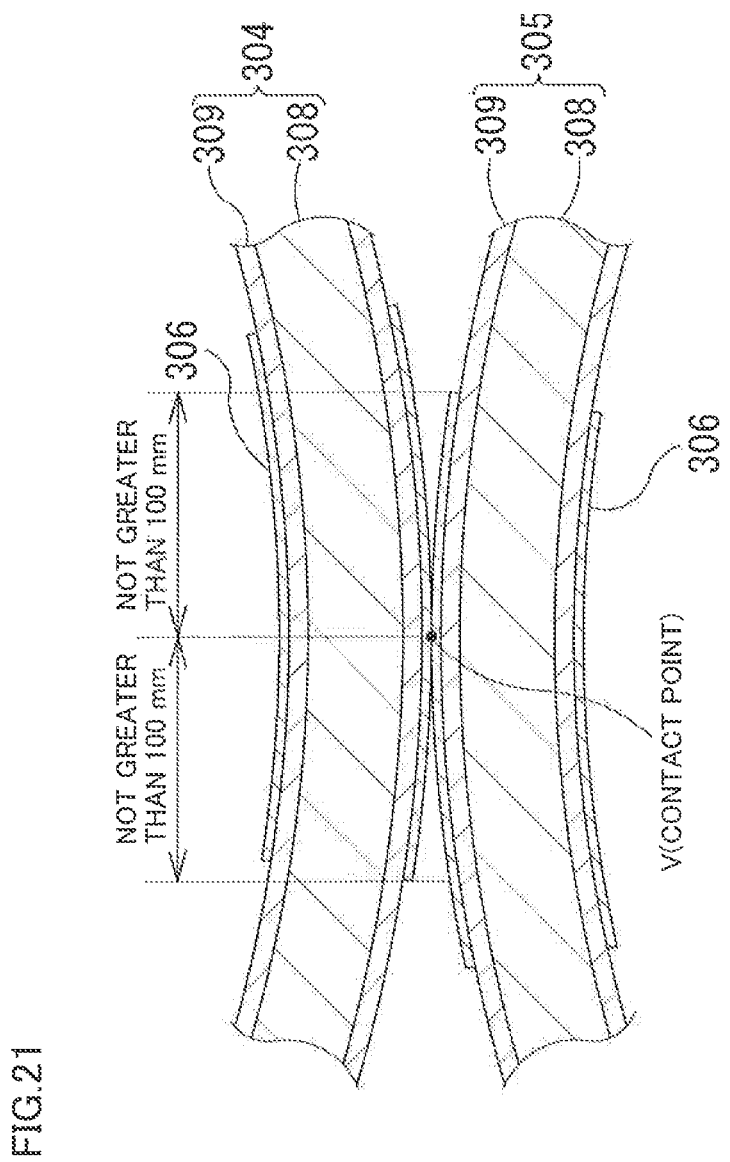
FIG. 21 is a cross-sectional view schematically showing a state of contact of a semiconductive layer provided in a coil.

As shown in FIG. 21, semiconductive layer 306 is provided at least in a region not smaller than a largest cross-sectional width of a segment coil in opposing directions along an axial line of the segment coil, with a contact point being defined as the center. For example, in a case that a coil having a rectangular cross-section is adopted, semiconductive layer 306 is preferably provided in a region not shorter than a length of a diagonal line of the rectangular cross-section, with the contact point above being defined as the center. In the present embodiment, semiconductive layer 306 is provided in an area not smaller than the largest cross-sectional width of the segment coil and not greater than 100 mm. A thickness of semiconductive layer 306 is not particularly limited and semiconductive layer 306 can be formed, for example, to a thickness from 5 to 100 μm.

Figure 20:
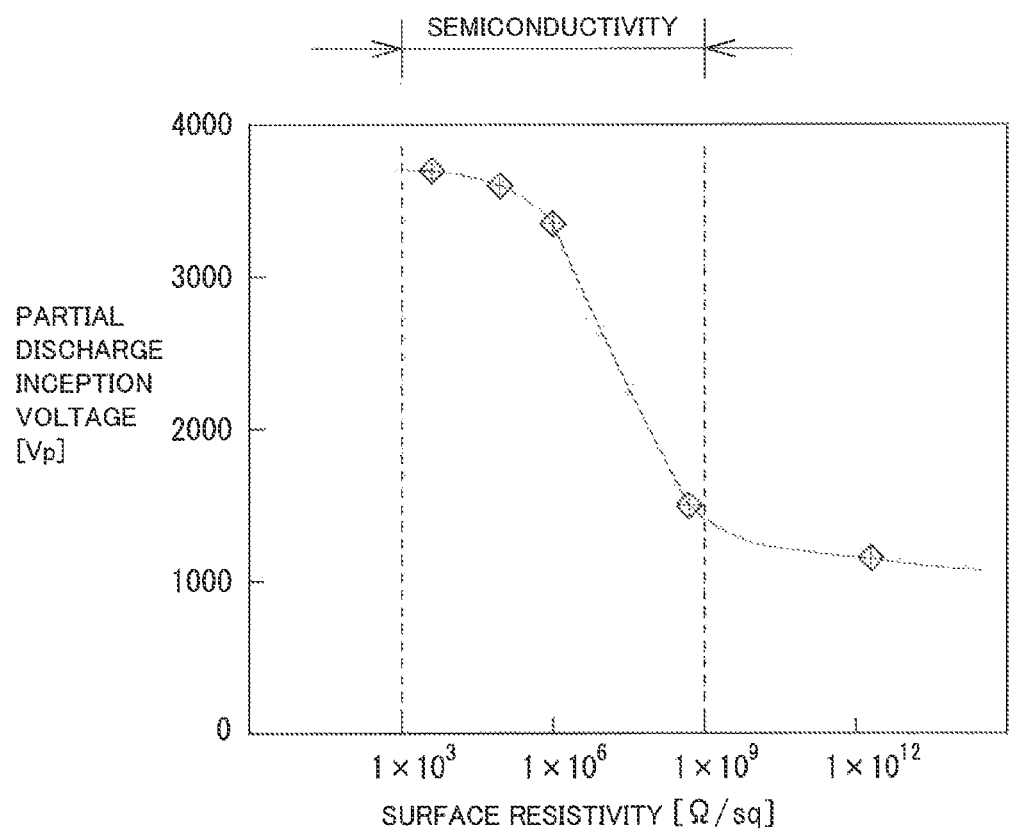
FIG. 20 is a diagram showing relation between a partial discharge inception voltage and surface resistivity.

As shown in FIG. 20, surface resistivity of semiconductive layer 306 is set to $1\times10^3$ to $1\times10^9$ Ω/sq, and a heat-shrinkable tube in which a conductive material is blended in a fluorine-based resin such as PFA or FEP is attached in an area of 200 mm with a contact point V above being defined as the center. A tape material having semiconductivity such as a Kapton adhesive tape (registered trademark of DuPont USA) or aramid non-woven fabric (Nikkan Industries Co., Ltd., #5183, 65 μm) can be adopted.

As shown in FIG. 20, since semiconductive layer 306 has surface resistance of $1\times10^3$ to $1\times10^9$ Ω/sq, a partial discharge inception voltage can be raised to 1000 V or higher. In the present embodiment, semiconductive layers 306 and 306 of segment coils 304 and 305 are opposed to each other in an area of 100 mm extending in each of opposing directions with contact point V lying therebetween, and a partial discharge inception voltage across these semiconductive layers 306 and 306 is set to 1000 V or higher. Therefore, a partial discharge prevention effect in the vicinity of contact point V can be obtained.

In a case that a semiconductive layer is provided in a region of 200 mm or greater, contact point V is preferably set every 200 mm in order to obtain a reliable effect. By setting semiconductive layer 306 as above, a partial discharge inception voltage across segment coils 304 and 305 proximate to each other in this region can be raised to 1000 V or higher.

Semiconductive layer 306 can be set to be very thin as compared with a conventional insulating layer provided for prevention of partial discharge. Therefore, partial discharge can effectively be prevented without increase in weight or cost of a stator.

A segment coil according to a fourth embodiment of the present invention will now be described with reference to FIGS. 22 to 26.

Since the segment coil according to the fourth embodiment of the present invention is similar in construction to the already described segment coil except for a construction of a colored identification portion described below, detailed description of a basic construction of the segment coil will not be provided.

Figure 22:
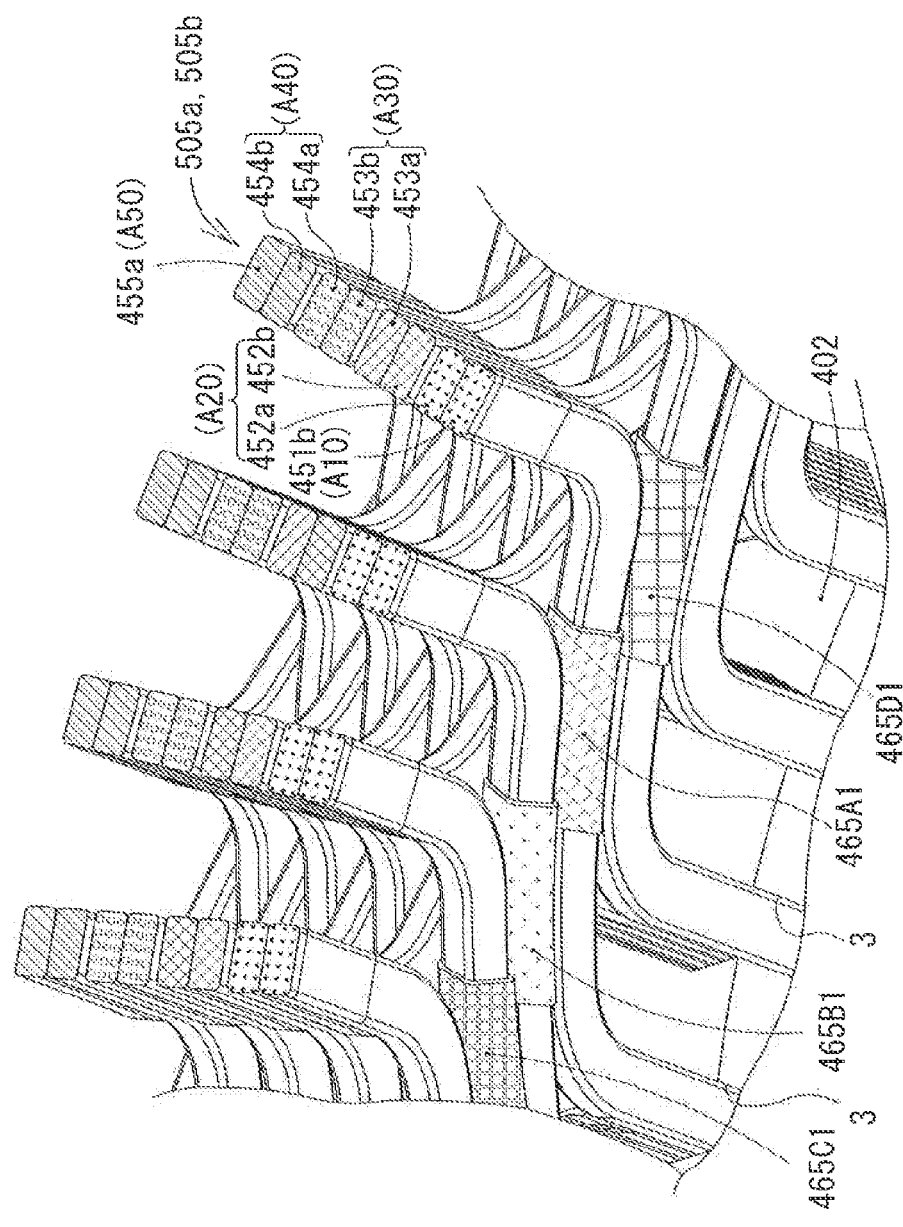
FIG. 22 is an enlarged perspective view of a terminal portion of a segment coil of a stator including the segment coil according to a fourth embodiment of the present invention.
Figure 23:
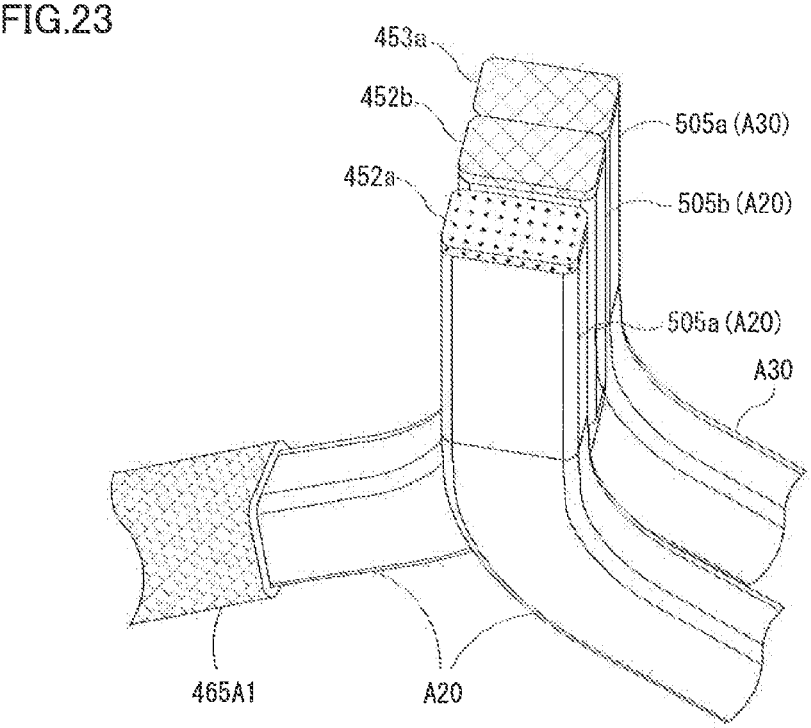
FIG. 23 is an enlarged perspective view of the terminal portions of the segment coils shown in FIG. 22.
Figure 24:
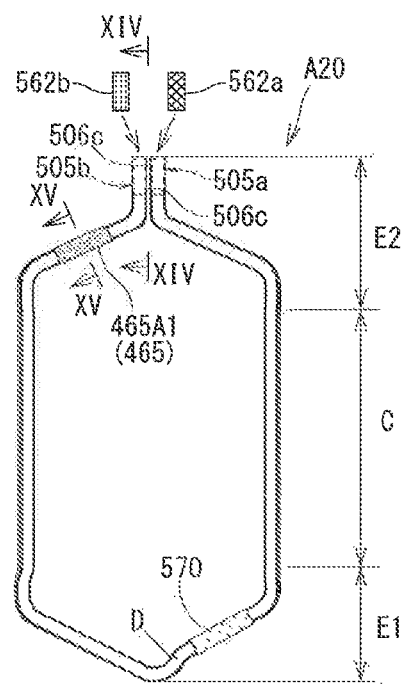
FIG. 24 is a front view showing a variation of the segment coil according to the fourth embodiment of the present invention.

As shown in FIG. 22, first colored identification portions 451b, 452a, 452b, 453a, 453b, 454a, 454b, and 455a allowing identification of terminal portions 505a and 505b of a series of connected segment coils A10 to A50 are provided. Basically, in segment coils A20 to A40 located in an intermediate portion, straight portions C shown in FIG. 24 are attached to the same slot. At least one of segment coil A10 arranged on the radially innermost side of the stator and segment coil A50 arranged on the radially outermost side of the stator is connected to a coil end portion extending from a straight portion attached to another slot.

First colored identification portions 451b, 452a, 452b, 453a, 453b, 454a, 454b, and 455a according to the present embodiment are formed by forming coil end surfaces of terminal portions 505a and 505b of segment coils A10 to A50 to be flat and applying color paints to these flat surfaces.

Colored identification portions 451b, 452a, 452b, 453a. 453b, 454a, 454b, and 455a are obtained by applying a paint of the same color to terminal portions connected to each other. In the embodiment, the same pattern has the same color. Namely, as shown in FIG. 22, colored identification portion 452b formed in segment coil A20 and colored identification portion 453a formed in segment coil A30 are in the same color. Similarly, as shown in FIG. 22, colored identification portion 451b and colored identification portion 452a, colored identification portion 453b and colored identification portion 454a, and colored identification portion 454b and colored identification portion 455a are different in color for each set. Therefore, by connecting through welding or ultrasound, terminal portions having the colored identification portion in the same color formed, a plurality of segment coils A10 to A50 belonging to the same phase are connected to thereby form a series of coils.

End surfaces of terminal portions 505a and 505b of segment coils are sites reliably visually recognized from outside of the stator. By providing a first colored identification portion on a coil end surface, a connection operation can be performed with terminal portions 505a and 505b of segment coils to be connected to each other reliably being identified.

Since the colored identification portions of segment coils connected to each other are in the same color, whether or not segment coils in the same color are connected to each other can also automatically be determined by observing end surfaces of the terminal portions with an image recognition apparatus after connection. Therefore, not only an operation for assembling a stator but also a checking operation can extremely efficiently be performed.

A technique for forming a colored identification portion is not particularly limited. For example, first colored identification portions 451b, 452a, 452b, 453a, 453b, 454a, 454b, and 455a can be formed by applying color paints.

In the present embodiment, second colored identification portion 465A1, 465B1, 465C1, 465D1 for identifying a segment coil assembled in each slot portion 11c is provided in one oblique side portion of coil end portion E2 of each of segment coils A10 to A50. Second colored identification portions 465A1, 465B1, 465C1, and 465D1 are obtained by providing colored layers having the same color in segment coils A10 to A40 accommodated in the same slot.

By providing second colored identification portions 465A1, 465B1, 465C1, and 465D1, a prescribed segment coil can readily be attached to a prescribed slot.

In the present embodiment, as shown in FIG. 24, a second colored identification portion 570 for disposition identification which allows identification of an order of disposition of segment coils accommodated in the same slot is provided.

Second colored identification portion 570 for disposition identification is provided independently in coil end portion E1 opposite to coil end portion E2 where second colored identification portion 465A1, 465B1, 465C1, 465D1 for slot identification is provided. Second color identification 570 for disposition identification can be formed, for example, by providing coloring in the same color and different in density in accordance with an order of disposition. Colored identification portions different in color can appear alternately in segment coils attached to the same slot.

By providing second colored identification portion 570 for disposition identification, an assembly operation can be performed, with an order of assembly (disposition) of segment coils assembled into each slot being readily identified.

Figure 26:
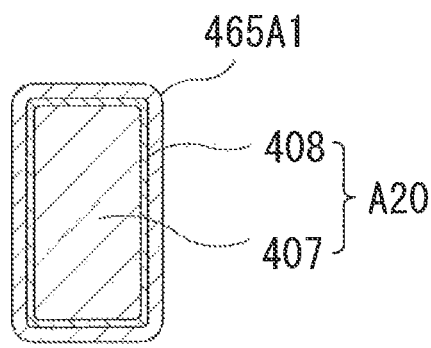
FIG. 26 is a cross-sectional view along the line XV-XV in FIG. 25.

A construction and a form of second colored identification portions 465A1, 465B1, 465C1, and 465D1 are not particularly limited. For example, as shown in FIG. 26, likewise the first colored identification portion, second colored identification portion 465A1 can be formed by applying a paint having a corresponding color to a prescribed region on an insulating layer 408 provided in an elemental wire 407.

The second colored identification portion can be obtained by bonding a color tape material or attaching a color tube material to a prescribed region in a segment coil. For example, an insulating resin tape material (trade name Kapton tape) manufactured by Permacel can be adopted as the color tape material. A heat-shrinkable tube material such as an insulating resin tube material (trade name Sumitube) manufactured by Sumitomo Electric Industries, Ltd. can be adopted as the color tube material. By adopting an insulating paint or tape material or tube material, the second colored identification portion can function as an additional insulating layer. Thus, not only an operation for assembly or an operation for connection of segment coils can readily be performed but also partial discharge between adjacent segment coils can effectively be prevented.

FIG. 24 shows a second variation in connection with the first colored identification portion. In the second variation, the first colored identification portion is implemented by providing a color cap in terminal portions 505a and 505b.

Since terminal portions 505a and 505b are formed by removing an insulating layer, oxidation of a conductor surface or adhesion of grease thereto is likely during handling or storage. By providing a color cap, the exposed conductor surface can be protected.

Figure 25:
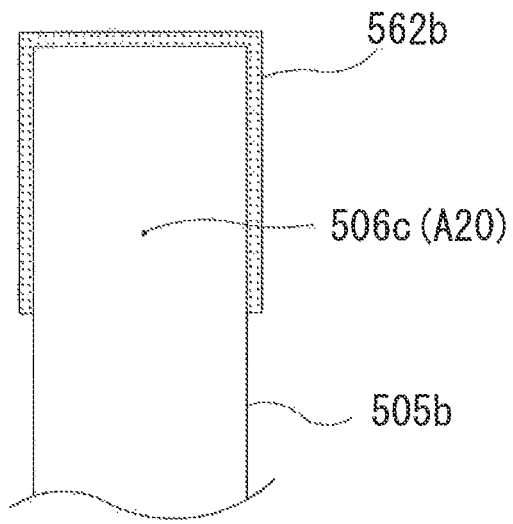
FIG. 25 is a right side view along the line XIV-XIV in FIG. 24.

As shown in FIG. 25, the color cap according to the present embodiment is formed from a resin molded product in a form covering a surface except for a connection surface 506c. By adopting such a construction, connection can be made while color caps 562a and 562b remain attached.

A material forming the color cap is not particularly limited and a color cap molded from a colored resin material or a color cap formed from a metal material followed by coloring can be adopted.

The colored identification portion described already can be formed by performing a colored identification portion forming step of providing prescribed coloring to a prescribed region of a surface of a coil element simultaneously with or subsequent to the additional insulating layer forming step.

A segment coil according to a fifth embodiment of the present invention will now be described with reference to FIGS. 27A and 27B.

Since the segment coil according to the fifth embodiment of the present invention is similar in construction to the already described segment coil except for an inclined region K described below, detailed description of a basic construction of the segment coil will not be provided.

Figure 27A:
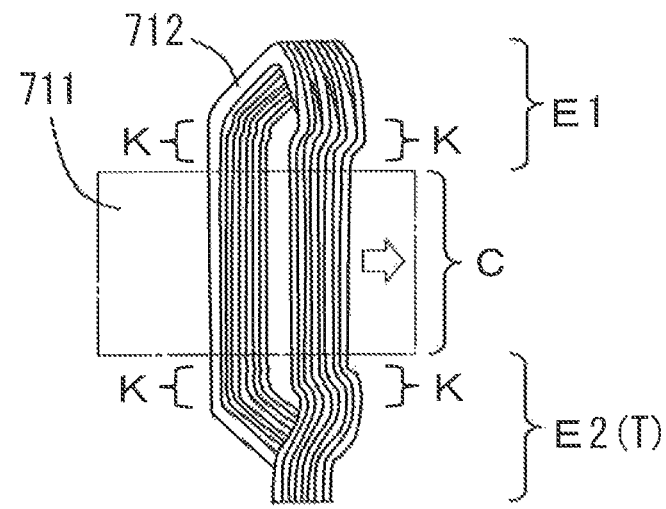
FIG. 27A is a diagram showing in a simplified manner, a state that segment coils according to a fifth embodiment of the present invention are arranged as aligned in the same slot portion and a perspective view showing the segment coils.

As shown in FIG. 27A, in a region of a pair of coil end portions E1 and E2 except for thick region A which will be described later, inclined region K inclined radially outward of an annular core 711 is provided. It is noted that a direction shown with a hollow arrow indicates radially outward in FIGS. 27A and 27B.

Specifically, segment coils arranged adjacently in the same slot of a stator are radially inclined in a region extending from the slot to a portion where it is bent in a circumferential direction toward the peak portion of the coil end portion, so that an insulating layer provided in the coil end portion of the segment coil is brought in contact in a radial direction of the stator. The insulating layer is formed such that a distance between coils in the radial direction of the stator at a portion of contact is greater than a distance between coils in the slot.

The "distance between coils" here means a distance between centers of adjacent segment coils 712 in a radial direction of an annular core.

Figure 27B:
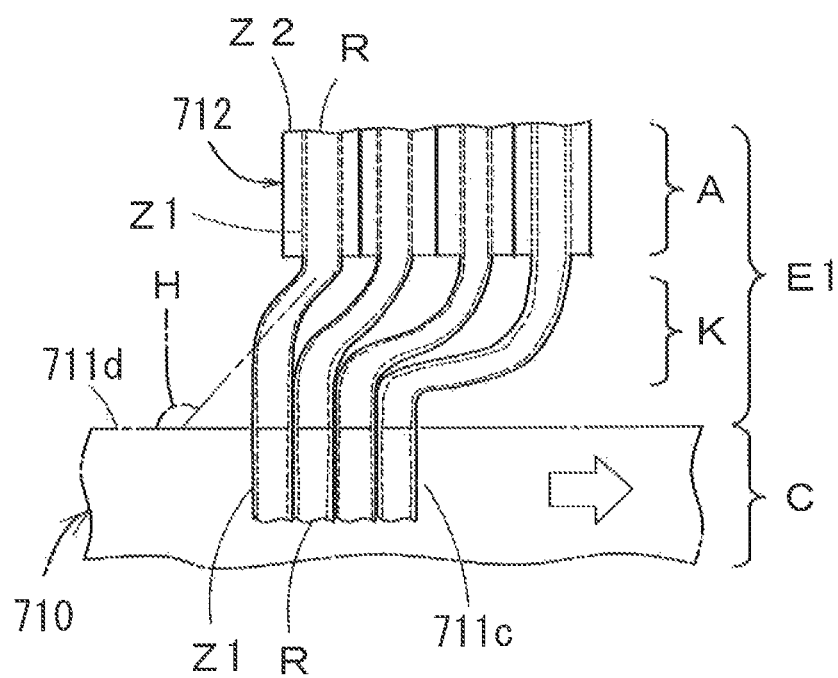
FIG. 27B is a diagram showing in a simplified manner, a state that the segment coils according to the fifth embodiment of the present invention are arranged as aligned in the same slot portion and a diagram schematically showing a main portion of a side surface of the segment coils.

As partially shown in FIG. 27B, inclined region K is set within an area in coil end portions E1 and E2 approximately 500 μm to 5 mm from an end surface 711d of annular core 711 in an axial direction of annular core 711.

As shown in FIG. 27B, an angle of inclination means angle H formed between segment coil 712 forming inclined region K and end surface 711d of annular core 711.

In the present embodiment, a thickness of an insulating layer in segment coil 712 is different between straight portion C and coil end portions E1 and E2.

More specifically, in straight portion C, an insulating layer is formed by covering the surface of elemental wire R only with base insulating layer Z1. In contrast, in a prescribed region in a region except for inclined region K in coil end portions E1 and E2, thick region A is formed by covering the surface of elemental wire R with base insulating layer Z1 and covering the surface of base insulating layer Z1 further with additional insulating layer Z2.

It is noted that the "prescribed region" here means a region of coil end portions E1 and E2 including a site where insulating layers of adjacent segment coils 712 are brought in contact with each other.

FIG. 27B illustrates thick region A as exaggerated for the sake of convenience of illustration.

Any elemental wire R may be employed so long as it is a normally used elemental wire forming a coil, for example, of copper.

Polyamide imide or polyimide can be employed as a material for base insulating layer Z1. A thickness of base insulating layer Z1 should only comply with a design voltage between coil turns. For example, when a design voltage is 500 V, desirably, a thickness is approximately from 15 μm to 30 μm and more suitably approximately from 15 μm to 25 μm. When a thickness is smaller than 15 μm, probability of deterioration of a film due to partial discharge or occurrence of pin holes during manufacturing increases. When a thickness exceeds 25 μm, lowering in assembly performance due to increase in heat generation or increase in outer diameter caused by lowering in space factor in slot portion 11c is caused. Pulling through a die or electrodeposition can be employed as a formation method. It is noted that base insulating layer Z1 for straight portion C and coil end portions E1 and E2 can integrally be formed in the same step.

A super engineering plastic material represented by polyamide imide or polyimide or a material in which an inorganic filler is mixed in engineering plastic can be used as a material for additional insulating layer Z2. Pulling through a die, electrodeposition, powder coating, adhesion of a tape, dipping, spray coating, insert injection molding, or extrusion can be employed as a formation method.

Since a peak voltage approximately twice as high as an input voltage is applied as a voltage between motor phases due to influence by inverter surge, for example, when a design voltage is 1000 V, desirably, a thickness of additional insulating layer Z2 is approximately from 40 μm to 200 μm and more preferably approximately from 80 μm to 120 μm. When a thickness is smaller than 40 μm, a film is deteriorated due to partial discharge. When a thickness exceeds 200 μm, a dimension due to increase in conductor spacing at a coil end increases.

By adopting the construction above, segment coils 712 arranged adjacently in the same slot can effectively be brought in close contact between straight portions C and between coil end portions E1, E2.

In particular, in the present embodiment, in adjacent segment coils 712 arranged in the same slot, base insulating layer Z1 for straight portion C and additional insulating layer Z2 forming thick region A of coil end portions E1 and E2 are brought in close contact without a gap. Thus, a high space factor in a slot can be achieved and the number of turns of a coil in the slot can be increased.

Corona discharge described already is likely in a region where a gap between adjacent segment coils is small. In the present embodiment, particularly, corona discharge between adjacent segment coils 712 of the same phase can effectively be prevented.

Thus, a stator capable of maintaining good insulation, which allows effective prevention of deterioration of base insulating layer Z1 and additional insulating layer Z2 involved with corona discharge between adjacent segment coils 712 of the same phase, can be obtained.

Angle of inclination H of segment coil 712 and a length of segment coil 712 may each be different. In forming a stator, in adjacent segment coils 712 arranged in the same slot 711c, angle of inclination H of a coil in region K should be such that an angle of inclination of segment coil 712 arranged on the outer circumferential side of annular core 711 is greater than an angle of inclination of segment coil 712 arranged on the inner circumferential side of annular core 711 and a length of region K should be such that a length of segment coil 712 arranged on the outer circumferential side of annular core 711 is longer than a length of segment coil 712 arranged on the inner circumferential side of annular core 711.

Though all adjacent segment coils 712 in the same slot are in contact in the radial direction of the annular core in straight portion C and in thick region A of coil end portions E1 and E2 in the present variation, limitation thereto is not necessarily intended, and the construction can be changed as appropriate so long as at least one set of adjacent segment coils 712 arranged in the same slot are in contact in the radial direction of the annular core in straight portion C and in thick region A of coil end portions E1 and E2.

The scope of the present invention is not limited to the embodiments described above. It should be understood that the embodiments disclosed herein are illustrative and non-restrictive in every respect. The scope of the invention of the present application is defined by the terms of the claims, rather than the meaning described above, and is intended to include any modifications within the scope and meaning equivalent to the terms of the claims.

INDUSTRIAL APPLICABILITY

The present invention can be made use of in a motor in which electric power switched by inverter control is supplied to a coil.

REFERENCE SIGNS LIST 1 motor; 2 battery; 3 relay; 4 boost converter; 5 inverter control unit; 6 high-voltage cable; 10 stator; 11 annular core; 11a core main body; 11b tooth portion; 11c slot portion; 11d end surface; 12 segment coil; 12a first wound coil; 12b second wound coil; 12c third wound coil; 12d fourth wound coil; 12U U-phase terminal; 12UN U-phase neutral point; 12V V-phase terminal; 12VN V-phase neutral point; 12W W-phase terminal; 12WN W-phase neutral point; 21 fixing means; 21a first fixing pin; 21b second fixing pin; 22 pressing means; 22a first pressing jig; 22b second pressing jig; 31 annular core; 32 segment coil; 41 annular core; 42 segment coil; 201 segment coil; 201A segment coil; 201B segment coil; 201C segment coil; 201D segment coil; 201E segment coil; 205a tip end portion for joint; 205b tip end portion for joint; 206 elemental wire; 207 base insulating layer; 210a oblique side portion; 211a oblique side portion; 212a additional insulating layer; 212b additional insulating layer; 212c additional insulating layer; 212d additional insulating layer; 214a additional insulating layer; 214b additional insulating layer; 214c additional insulating layer; 214d additional insulating layer; 212a additional insulating layer; 304 segment coil; 305 segment coil; 306 semiconductive layer; 308 elemental wire; 309 insulating layer; 407 elemental wire; 408 insulating layer; 451b first colored identification portion; 452a first colored identification portion; 452b first colored identification portion; 453a first colored identification portion; 453b first colored identification portion; 454a first colored identification portion; 454b first colored identification portion; 455a first colored identification portion; 465A1 first colored identification portion; 465B1 first colored identification portion; 465C1 first colored identification portion; 465D1 first colored identification portion; 505a tip end portion for joint; 505b tip end portion for joint; 562 color cap; 562b color cap; 570 second colored identification portion; 711 annular core; 711c slot portion; 711d end surface; 712 segment coil; A thick region; A10 segment coil; A20 segment coil; A30 segment coil; A40 segment coil; A50 segment coil; B coil element; B1 coil piece; B2 coil piece; B3 coil piece; B4 coil piece; C straight portion; D recessed step portion; D1 step portion; E1 coil end portion; E2 coil end portion; E3 coil end portion; E4 coil end portion; F inclined portion; G angle; H angle; T length; J gap; K bent portion; L gap; M angle; N gap; P length; Q length; R elemental wire; T terminal portion; V contact point; Z insulating layer; Z1 base insulating layer; and Z2 additional insulating layer.

The invention claimed is:

1. A segment coil in a stator of a rotating electric machine formed from an annular core and coils of a plurality of phases, segment coils being arranged as aligned in a radial direction in slots of said annular core and coils in adjacent slots being arranged as aligned in a circumferential direction, comprising:
    a straight portion accommodated in said slot; and
    two coil end portions protruding outward from said slot,
    any one coil end portion of said two coil end portions including a first coil piece and a second coil piece, said second coil piece being to be sunk radially inward of an adjacent segment coil, said first coil piece and said second coil piece being formed by inclining a coil at different angles toward said straight portion with a vertex lying between said first coil piece and said second coil piece, and
    a recessed step portion provided in said second coil piece, said recessed step portion being formed by setting a first angle formed between said second coil piece in a region in the vicinity of said vertex and a tangential line passing through said vertex to be greater than a second angle formed between said second coil piece except for the region in the vicinity of said vertex and said tangential line, said recessed step portion being not provided in said first coil piece.

2. The segment coil according to claim 1, wherein an additional insulating layer is provided in a prescribed region of one of said first and second coil pieces not including said recessed step portion.

3. The segment coil according to claim 2, wherein said additional insulating layer is provided in a portion where segment coils belonging to different phases face each other.

4. The segment coil according to claim 2, wherein said additional insulating layer is formed on a radially inner surface and/or a radially outer surface of the annular core of the segment coil.

5. The segment coil according to claim 2, wherein said any one coil end portion is formed in a mountain shape, and said additional insulating layer is provided in an oblique side portion except for a portion near a peak portion of said mountain shape and portions near opposing mountain-foot portions and/or in a straight portion extending from the slot.

6. The segment coil according to claim 1, wherein a semiconductive layer is provided in a prescribed region of a coil piece of said first and second coil pieces not including said recessed step portion, and said semiconductive layer of a segment coil arranged in proximity and belonging to a different phase is in contact at at least one point.

7. The segment coil according to claim 1, wherein a colored identification portion is provided on a surface in a prescribed region of said segment coil.

8. The segment coil according to claim 7, wherein a coil end portion not including said recessed step portion of the two coil end portions of said segment coil includes a terminal portion for connection of an adjacent segment coil, and a first colored identification portion allowing identification of a terminal portion of a segment coil to be connected is provided in the terminal portion or in a portion near the terminal portion.

9. The segment coil according to claim 7, comprising a second colored identification portion provided on a surface other than said terminal portion and formed to allow identification of a slot where each segment coil is attached and/or a position of disposition in the slot.

10. The segment coil according to claim 9, wherein said second colored identification portion is provided by applying a color paint, bonding a color tape material, or attaching a color tube material to a prescribed region of the segment coil.

11. The segment coil according to claim 9, wherein said second colored identification portion serves as an additional insulating layer.

12. A stator formed by arranging the segment coils according to claim 1, as aligned in slots of an annular core.

* * * * *